(12) United States Patent
Atchley et al.

(10) Patent No.: US 10,211,610 B2
(45) Date of Patent: Feb. 19, 2019

(54) SYSTEMS FOR BACKFEEDING PHOTOVOLTAIC ARRAYS THROUGH MAIN BREAKER BOXES

(71) Applicant: SolarCity Corporation, San Mateo, CA (US)

(72) Inventors: Brian Atchley, San Rafael, CA (US); Garret Bautista, San Rafael, CA (US)

(73) Assignee: SolarCity Corporation, San Mateo, CA (US)

( * ) Notice: Subject to any disclaimer, the term of this patent is extended or adjusted under 35 U.S.C. 154(b) by 205 days.

(21) Appl. No.: 14/836,836

(22) Filed: Aug. 26, 2015

(65) Prior Publication Data

US 2016/0141846 A1  May 19, 2016

Related U.S. Application Data

(60) Provisional application No. 62/185,369, filed on Jun. 26, 2015, provisional application No. 62/130,815, filed on Mar. 10, 2015, provisional application No. 62/105,099, filed on Jan. 19, 2015, provisional application No. 62/079,417, filed on Nov. 13, 2014.

(51) Int. Cl.
| | |
|---|---|
| *H01R 9/18* | (2006.01) |
| *H02B 13/00* | (2006.01) |
| *H01H 71/08* | (2006.01) |
| *H01H 71/02* | (2006.01) |
| *H01R 4/30* | (2006.01) |
| *H01R 4/2408* | (2018.01) |
| *H01R 13/447* | (2006.01) |

(52) U.S. Cl.
CPC ........... *H02B 13/005* (2013.01); *H01H 71/02* (2013.01); *H01H 71/08* (2013.01); *H01R 4/301* (2013.01); *H01R 9/18* (2013.01); *H01H 2071/086* (2013.01); *H01R 4/2408* (2013.01); *H01R 4/302* (2013.01); *H01R 13/447* (2013.01)

(58) Field of Classification Search
CPC ........ H01R 13/648; H01R 4/34; H01R 4/304; H01R 4/301; H02S 20/30; H01H 71/08
USPC .......................................................... 439/883
See application file for complete search history.

(56) References Cited

U.S. PATENT DOCUMENTS

| | | | |
|---|---|---|---|
| 3,378,806 A * | 4/1968 | Wilkerson | H01R 4/302 411/337 |
| 4,916,265 A * | 4/1990 | Luallen | H01H 9/0207 200/294 |

(Continued)

FOREIGN PATENT DOCUMENTS

| | | |
|---|---|---|
| CN | 104064411 A | 9/2014 |
| DE | 10 2013 003 802 A1 | 9/2014 |

(Continued)

OTHER PUBLICATIONS

Wiles, John, Photovoltaic Power Systems and the National Electrical Code, Mar. 2001, pp. 1-117.

(Continued)

*Primary Examiner* — Briggitte R Hammond
(74) *Attorney, Agent, or Firm* — Kilpatrick Townsend & Stockton LLP

(57) ABSTRACT

A circuit breaker system is provided that receives combined power inputs from a utility and from an alternative energy source for backfeeding to the utility through a standard breaker box without overloading the bus bars of the breaker box.

13 Claims, 27 Drawing Sheets

(56) References Cited

U.S. PATENT DOCUMENTS

| | | | |
|---|---|---|---|
| 5,349,144 A | 9/1994 | Baragar | |
| 5,645,457 A * | 7/1997 | Hirayama | H01R 9/18 439/801 |
| 5,831,498 A * | 11/1998 | Maloney | H01H 9/0264 335/202 |
| 6,045,390 A * | 4/2000 | Metz | H02G 3/16 439/405 |
| 6,099,344 A * | 8/2000 | Chadbourne | H01R 4/2483 439/416 |
| 6,244,517 B1 * | 6/2001 | Courtois | F16B 3/06 191/29 R |
| 6,357,110 B1 * | 3/2002 | Shipp | H01R 4/34 29/432.2 |
| 6,750,391 B2 | 6/2004 | Bower et al. | |
| 7,056,161 B2 * | 6/2006 | Delcourt | H01R 4/30 174/51 |
| 7,056,162 B2 * | 6/2006 | Tournier | F16B 39/26 439/801 |
| 7,347,733 B2 * | 3/2008 | Murakami | H01H 85/044 439/620.27 |
| 7,648,389 B1 | 1/2010 | Scott et al. | |
| 7,855,871 B2 | 12/2010 | Hudgins, Jr. et al. | |
| 7,991,567 B1 | 8/2011 | Mulick | |
| 8,446,040 B2 | 5/2013 | Paik et al. | |
| 8,742,620 B1 | 6/2014 | Brennan et al. | |
| 8,784,130 B2 | 7/2014 | Scott et al. | |
| 2005/0207097 A1 | 9/2005 | Neace | |
| 2006/0160434 A1 * | 7/2006 | Pettersen | F16B 5/0258 439/801 |
| 2009/0149069 A1 | 6/2009 | Carcangiu et al. | |
| 2009/0275247 A1 | 11/2009 | Richter et al. | |
| 2012/0020791 A1 * | 1/2012 | Flemming | H02G 13/00 416/146 R |
| 2012/0281444 A1 | 11/2012 | Dent | |
| 2012/0326518 A1 | 12/2012 | Rusch et al. | |
| 2013/0252486 A1 | 9/2013 | Kosyanchuk et al. | |
| 2013/0269181 A1 | 10/2013 | McBride et al. | |
| 2014/0099820 A1 | 4/2014 | Robinson et al. | |
| 2014/0110230 A1 | 4/2014 | Eberts et al. | |
| 2014/0127935 A1 | 5/2014 | Scott et al. | |

FOREIGN PATENT DOCUMENTS

| | | |
|---|---|---|
| EP | 1596471 | 11/2005 |
| GB | 2367957 A | 4/2002 |
| WO | 2012035442 | 3/2012 |
| WO | 2013177623 | 12/2013 |

OTHER PUBLICATIONS

Wiles, John, "Connecting Inverters to the Grid", Home Power 134, Dec. 2009, pp. 106-108.

McCalmont, Scott, "Residential Supply-Side Interconnection", SolarPro Magazine, Issue 3.5, Aug./Sep. 2010, pp. 1-3.

"Energising Grid Connected Solar PV Systems" Essential Energy, Issue 3, Apr. 2011, pp. 1-14.

Wiles, John, "Making the Utility Connection", Home Power 111, Feb. 2006, pp. 94-96.

Kumm, Marty, Significant Code Changes in 2014 NEC Articles 690 and 705 affecting the installation of Solar Photovoltaic (PV) Systems, 2014, pp. 1-5.

Guest, Clark, "White Paper: Functional Test of the B3 Breaker Prototype", Q-Factory 33 LLC, 2014, pp. 1-4.

International Search Report and Written Opinion, dated Apr. 5, 2016, for International Patent Application No. PCT/US2015/060452, 15 pages.

\* cited by examiner

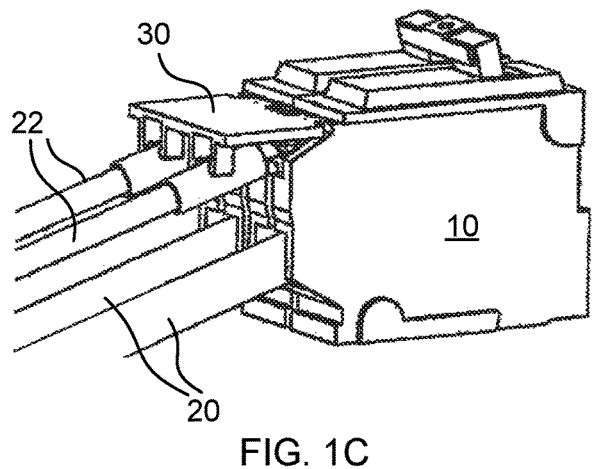
FIG. 1C
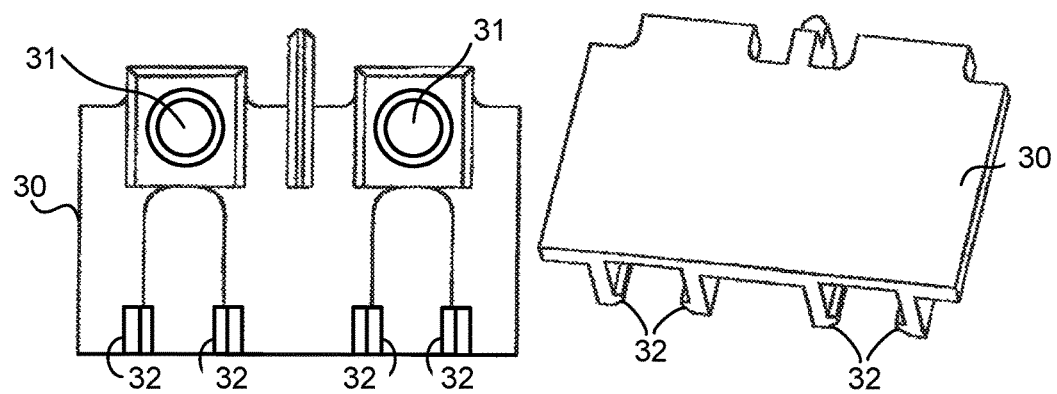
FIG. 1E
FIG. 1D

SYSTEMS FOR BACKFEEDING PHOTOVOLTAIC ARRAYS THROUGH MAIN BREAKER BOXES

RELATED APPLICATIONS

This claims priority to U.S. Provisional Patent Applications 62/079,417, filed Nov. 13, 2014; 62/105,099, filed Jan. 19, 2015; 62/130,815, filed Mar. 10, 2015, and 62/185,369, filed Jun. 26, 2015. All are entitled "Circuit Breakers For Backfeeding Photovoltaic Arrays And Other Alternative Energy Sources Through Main Breaker Boxes" and are incorporated herein by reference in their entirety for all purposes.

TECHNICAL FIELD

This relates to systems that enable the direct wiring of photovoltaic arrays into main circuit breaker boxes.

BACKGROUND

When an alternative energy source such as a photovoltaic array is installed on a homeowner's roof, it is often important to provide a path for the generated electricity to flow back to the utility whenever the power generated by the photovoltaic array is greater than the homeowner's demands. This is especially important in net metering jurisdictions as it allows the homeowner to make money by selling their generated power back to the utility.

Unfortunately, feeding power from a photovoltaic array back through the circuit breakers in the main breaker box can cause problems. Specifically, the photovoltaic array's power could overload the breaker box's bus bars during periods of high current draw. Bus bars have maximum amperage ratings that, when exceeded, can damage the bus bars. Therefore, the combined power fed into the bus bars from both the utility and the photovoltaic array could exceed the bus bar rating.

There are also various national, state, and municipal electrical guidelines and regulations that impose restrictions on the amount of power that can be backfed to utilities. For example, section 690.64(B)(2) of the 2008 National Electric Code, adopted by many states, requires that the sum of the ampere ratings of overcurrent devices in circuits supplying power to a busbar or conductor shall not exceed 120% of the rating of the busbar or connector." As a result of these restrictions, homeowners with alternative energy systems are often unable to use those systems to satisfy their load requirements and may also be required to limit the amount of power their systems backfeed to the utility.

One solution to this problem has been to upgrade (i.e., replace) the entire breaker box with a new box having bus bars that have higher amperage ratings. However, this approach adds cost and time to the photovoltaic system installation, and on permit approvals. Solar installers (and homeowners) often do not want to install a new breaker box because of the disruption. Another approach has been to install circuit breakers for the photovoltaic array in a separate secondary breaker box. The problem with this approach is both the cost in installing the secondary breaker box (dedicated only to the photovoltaic array) and the additional space required to install this secondary sub-panel breaker box.

Another existing solution to the problem of overloading the bus bars has been to install the utility input breaker and the solar input breaker at opposite ends of the breaker box's bus bars (i.e., the building's actual load is wired between the two breakers). This prevents the current from the utility and the photovoltaic system from adding up and overloading the bus bars. Instead, the current delivered to the building's actual loads is separated into current from the photovoltaic array travelling through one portion of the bus bars and current from the utility mains travelling through another portion of the bus bars. Unfortunately, the problem with this approach is that any inadvertent re-positioning of the two power breakers away from the ends of the bus bars could result in a situation where the building load is not positioned between the utility and photovoltaic inputs, which could overload the bus bars. Simply put, this approach relies on installers correctly wiring the breaker box initially, and not re-positioning the breakers after their installation. Accidental re-positioning of the breakers by an electrician at a later time could be problematic. In addition, although this solution is acceptable under most codes, the photovoltaic system breaker's maximum amperage can still be limited by the 120% rule in section 690.84(B)(2) of the 2008 National Electric Code.

Another solution to overloading bus bars involves a specially designed breaker. It can act as a supply-side line tap in which power from utility main and photovoltaic systems make separate attachments to the breaker. Power can then flow from the photovoltaic system through internal connections of the breaker to the utility mains with no involvement of the breaker box bus bars. An example of such a system is a breaker system sold by Q-Factory 33 under the trademark B3 BYPASS. The B3 Bypass breaker system has a first breaker between the utility mains and the bus bars, and a second breaker between the photovoltaic system and the utility mains. One limitation of the B3 Breaker system is that it requires two internal circuit breakers within a single housing.

SUMMARY

The present system provides a variety of electro-mechanical solutions in which the power input lines from the photovoltaic array (or any other alternative energy source including, but not limited to, wind, battery, power generators, or any other form of renewable or non-renewable energy, including gas generators) and the power input lines from the utility are connected together and fed into the same circuit breaker. As a result, power from the photovoltaic array can be backfed to the utility without traveling through the bus bars of the electric panel in which the circuit breaker is installed (when the power generated by the photovoltaic array is greater than the homeowner's demands).

An advantage of the present system is that the circuit breaker design can be used in existing breaker boxes, and does not require installation of a new breaker box. Another advantage is that it uses the same tripping current as the standard utility circuit breaker it replaces, without upgrading the bus bars to accommodate higher current levels. Yet another advantage is that it is small and fits within conventional installed breaker boxes.

In one embodiment, a system is provided for connecting an alternative energy source to a main breaker box. It can include a circuit breaker having a receptacle for receiving a utility power wire therein, and a line tap screw assembly for electrically connecting an alternative energy wire to the utility power wire. The line-tap connector can have a clasp dimensioned to electrically connect onto a distal end of the alternative energy wire, and a screw passing through an aperture in the clasp. A contact ring can be received around the screw. A retaining ring can hold the contact ring against the clasp such that the screw and the clasp are in electrical contact with one another. An advantage of this design is that electrical contact between the screw and the clasp can be maintained as the screw is rotated. Thus, loosening the screw need not reduce the electrical contact between the screw and the clasp.

In other embodiments, a pair of nested screws are used to connect the utility and photovoltaic power lines together. An advantage of this embodiment is that the second screw can be loosened and removed without the first screw also loosening. As a result, the second screw can be loosened to remove the photovoltaic wire while the first screw holds the utility wire firmly in place in the circuit breaker.

In other embodiments, a system is provided for connecting a photovoltaic array to a main breaker box with a circuit breaker having first and second receptacles for receiving utility and photovoltaic power wires therein. Both receptacles can be in electrical communication with one another. The first and second receptacles can be disposed at the same end of the main housing and sized to receive power wires of different gauges.

Further embodiments of the invention present lug connectors comprising insulation piercing connector assemblies that electrically connect the photovoltaic power wire to the utility power wire.

BRIEF DESCRIPTION OF THE DRAWINGS

FIG. 1C is a perspective view of the device of FIG. 1A with the protective cover partially snapped on according to an embodiment of the invention.

FIG. 1D is a top perspective view of the protective cover according to an embodiment of the invention.

FIG. 1E is a bottom plan view of the protective cover according to an embodiment of the invention.

DETAILED DESCRIPTION OF THE DRAWINGS

Figures 1A, 1B:
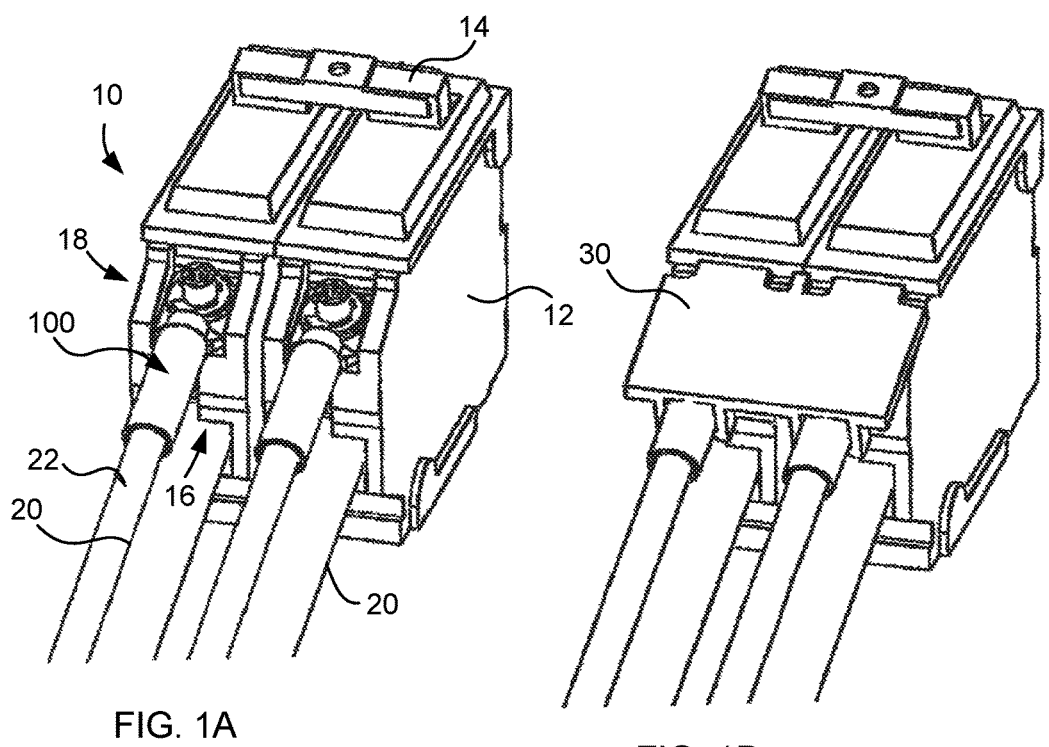
FIG. 1A is a perspective view of a circuit breaker with its protective cover removed according to an embodiment of the invention.
FIG. 1B is a perspective view of the device of FIG. 1A with the protective cover installed according to an embodiment of the invention.

The present system provides a system for connecting an alternative energy power source to a circuit breaker in a main breaker box in which a utility power wire and an alternative energy power wire are electrically connected together and received into a circuit breaker. A number of different embodiments of the present supply-side line-tap approach are described below.

Referring first to FIGS. 1A to 2C, combined solar and utility circuit breaker 10 is shown. As will be explained below, the circuit breaker design labeled as "U/SB" (a.k.a. "utility/solar breaker") in FIGS. 14F and 14G can be the same circuit breaker as described as combined solar and utility circuit breaker 10 in FIGS. 1A to 2C. As such, FIGS. 14A to 14G show advantages of the operation of breaker 10 in a working supply side line-tap environment.

Circuit breaker 10 can include a main housing 12; standard circuit breaker switch 14 on main housing 12; and main receptacle 16 for receiving utility power wire 20 therein. However, photovoltaic array power wire 22 can be piggy-backed onto utility power wire 20 in a supply-side line tap approach to be in electrical communication with utility power wire 20, as follows.

As understood herein, "receptacles" are simply the physical apertures where the ends of the wires are attached onto the housing of the circuit breaker. As can be seen, receptacles 16 and 18 are both disposed at the same end of the main housing 12. As can also be seen, utility power wire 20 is typically a larger gauge wire than photovoltaic array power wire 22.

Figure 2B:
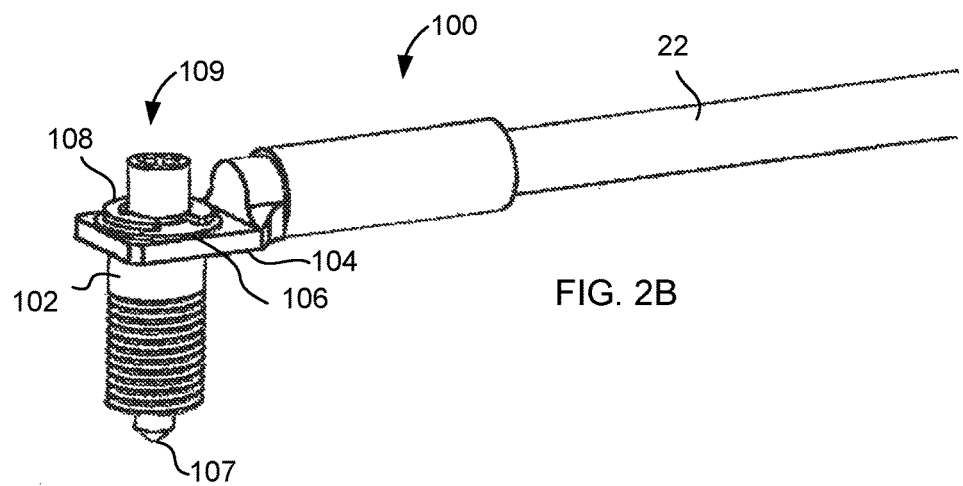
FIG. 2B is an assembled view of the line tap of FIG. 2A according to an embodiment of the invention.
Figure 2A:
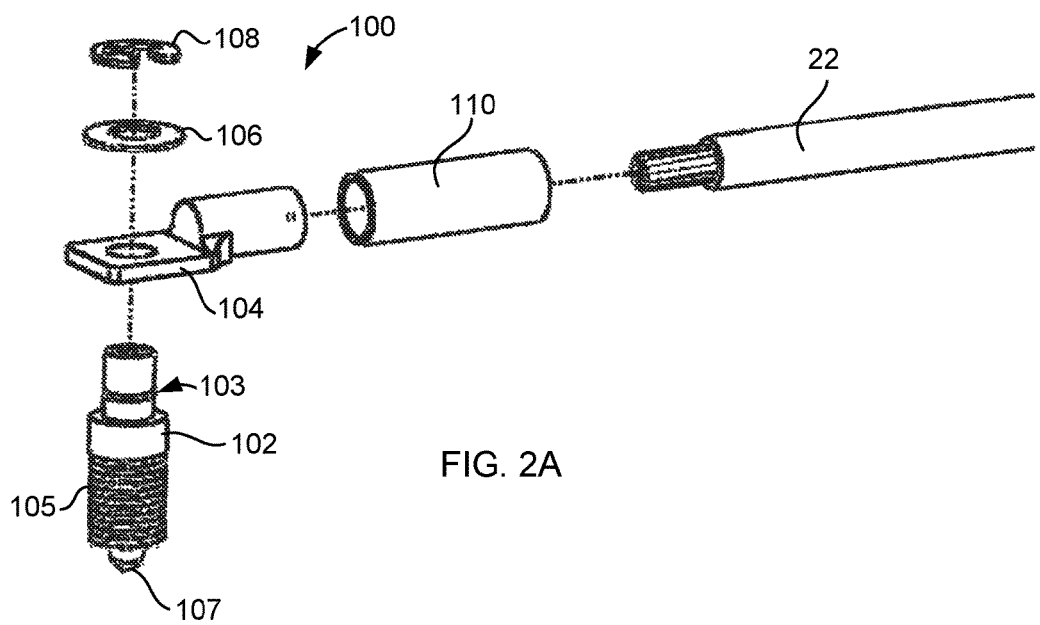
FIG. 2A is an exploded perspective view of the line tap that is received into the circuit breaker of FIGS. 1A to 1E according to an embodiment of the invention.
Figure 2C:
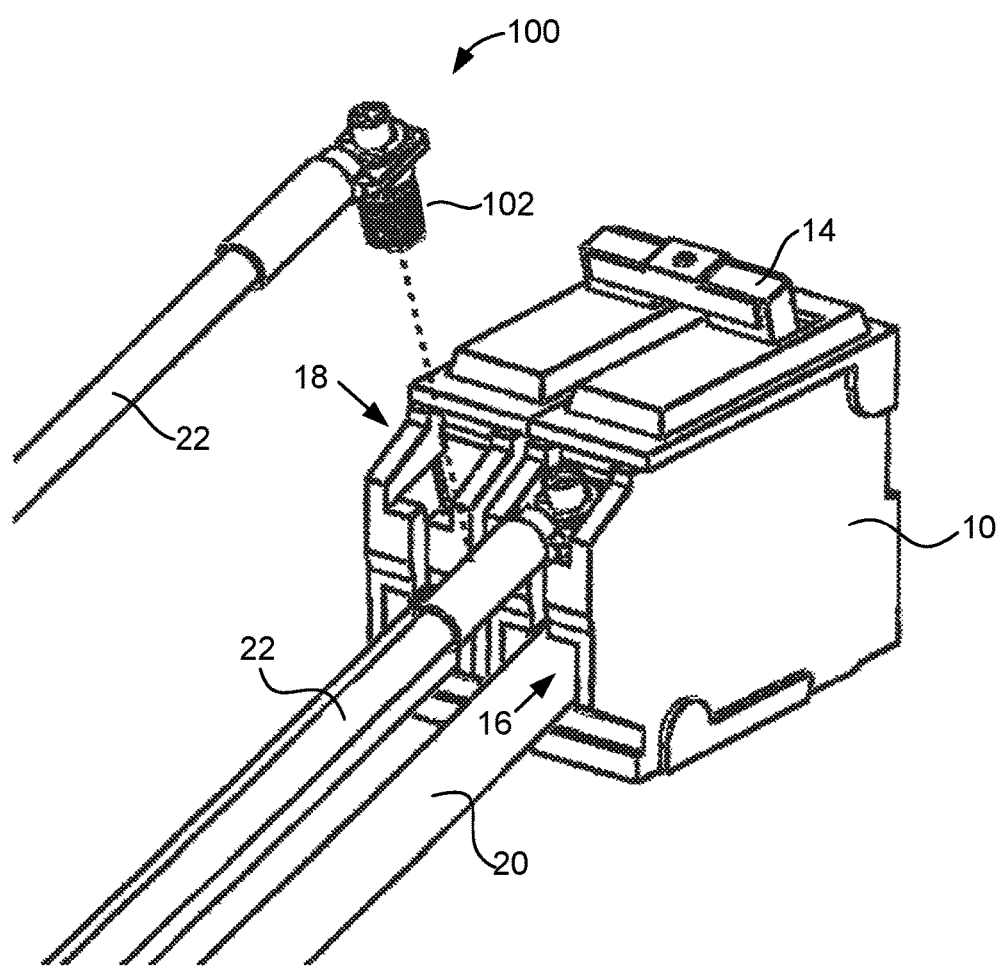
FIG. 2C shows the line tap of FIGS. 2A and 2B prior to its insertion into the circuit breaker according to an embodiment of the invention.

As shown in FIGS. 2A to 2C, screw assembly 100 can include a line tap of photovoltaic array power wire 22 onto utility power wire 20. Screw assembly 100 can include screw 102 having a narrowed top end that is received through a hole in clasp 104. Screw 102 may have a notch 103 wrapping therearound that projects slightly above the hole in clasp 104. Screw 102 also may have a mid-section 105 that has a diameter larger than the diameter of the aperture in clasp 104. Contact ring 106 may also be provided.

When assembled, the inner surfaces of retaining ring 108 can be received into notch 103, holding contact ring 106 down against the top of clasp 104, as shown. Screw 102 has an upper end 109 into which the end of a screwdriver is inserted. As such, screw 102 can be rotated to tighten it into receptacle 18 (on the top rear of circuit breaker 10). When tightened into receptacle 18, bottom end 107 of screw 102 can contact utility power wire 20, such that wires 20 and 22 can be in electrical contact with one another. The advantage of this approach is the both utility wire 20 and photovoltaic wire 22 will be electrically connected to one another in circuit breaker 10. As will be described in FIGS. 14A to 14G, this arrangement can provide an effective way to backfeed power from the photovoltaic array back to the utility.

One advantage of contact ring 106 being in contact with clasp 104 and screw 102 (with retaining ring 108 itself being in contact with both screw 102 and contact ring 106) is that electrical contact can be maintained between wire 22 and screw 102 regardless of screw 102 being rotated. Thus, electrical contact can be maintained as screw 102 is rotated. In addition, rotating screw 102 does not easily loosen or release screw 102 from wire 22. Rather, screw 102 can remain in electrical contact with wire 22 throughout its rotation. This is advantageous in that an installer can turn screw 102 to tighten or loosen the electrical connection of utility wire 22 to utility wire 20 without removing or otherwise loosening photovoltaic wire 22 from the assembly. Thus, an installer only needs to manipulate one screw when attaching both of wires 20 and 22 into circuit breaker 10. This embodiment results in a fast and efficient to tap photovoltaic wire 22 onto utility wire 10 right at the location where utility wire 20 is received into the breaker box. In addition, loosening screw 102 from its receptacle 18 may remove photovoltaic power wire 20 from circuit breaker 10. However, screw 102 does not fall off the end of photovoltaic power wire 20 in this embodiment. Thus, the danger of screws being fumbled or dropped is avoided. Additionally, sleeve 110 can provide electrical insulation.

FIG. 2C shows the supply side line-tap in use with photovoltaic wire 22 and utility wire 20 being received together into circuit breaker 10 and held together by single screw 102. Screw assembly 100 can be substituted for utility/solar breaker U/SB in FIGS. 14F and 14G, thereby providing an efficient way to backfeed photovoltaic power to the utility.

FIGS. 1B to 1E show additional snap-on protector 30 that is received over the top of screw assembly 100. Protector 30 can be snapped onto the top of photovoltaic power wires 22 with arms 32 of protector 30 snapping around photovoltaic wires 22 after screw 102 has secured photovoltaic wire 22 into receptacle 18. As a result, protector 30 can not typically be installed until after photovoltaic wires 22 have been secured. (FIG. 1C shows a partially installed position, prior to protector 30 being fully snapped down onto wires 22). Features 31 as seen in the bottom view of FIG. 1E can provide a recess to fit around the top of screws 102. Protector 30 can provide safety for an installer working with the system and can also assist in preventing screws 102 from becoming loose. Moreover, the installation of protector 30 can ensure that screws 102 are firmly secured down in place thereby securing utility wire 20 and photovoltaic power wire 22 prior to protector 30 being snapped down into position. Protector 30 can assist in keeping screw 102, contact ring 106 and retaining ring 108 clean, and also provide physical stability to the connection.

Figure 2D:
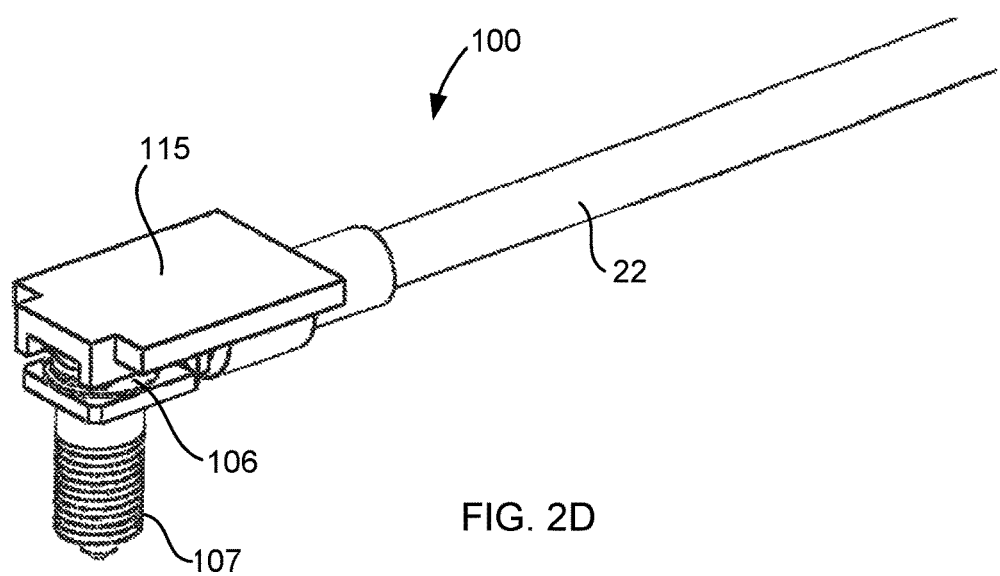
FIG. 2D shows an optional protective cover on the device of FIGS. 2A to 2C according to an embodiment of the invention.
Figure 2E:
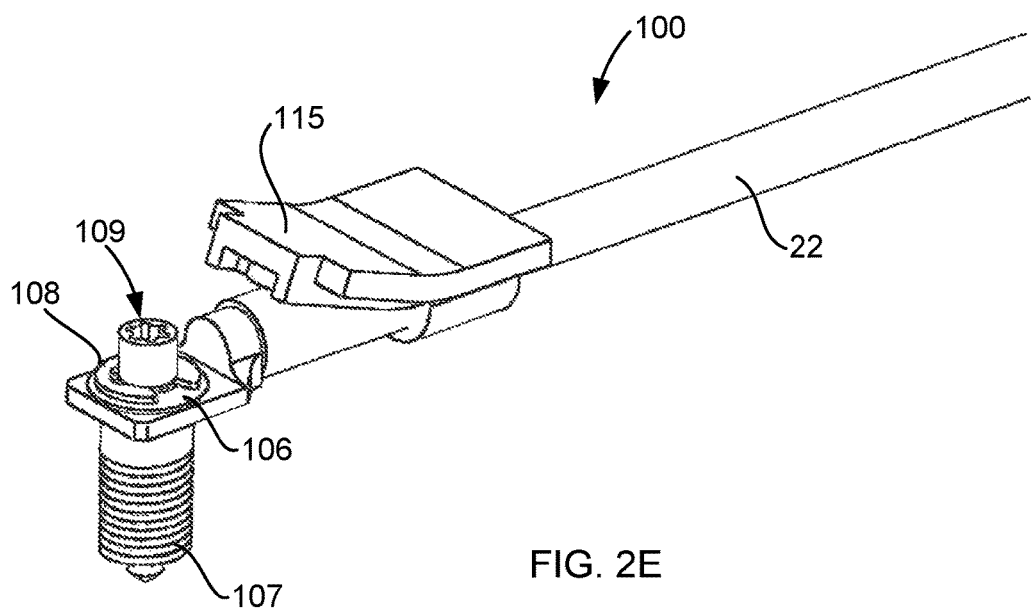
FIG. 2E shows the cover of FIG. 2D in a flipped up position according to an embodiment of the invention.
Figure 2F:
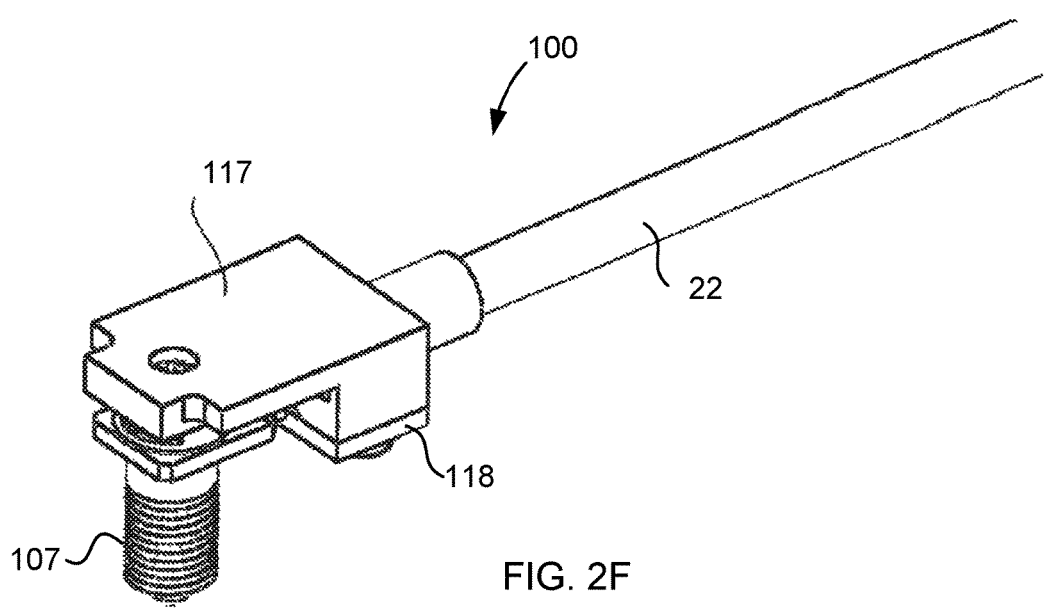
FIG. 2F shows another optional protective cover on the device of FIGS. 2A to 2C according to an embodiment of the invention.
Figure 2G:
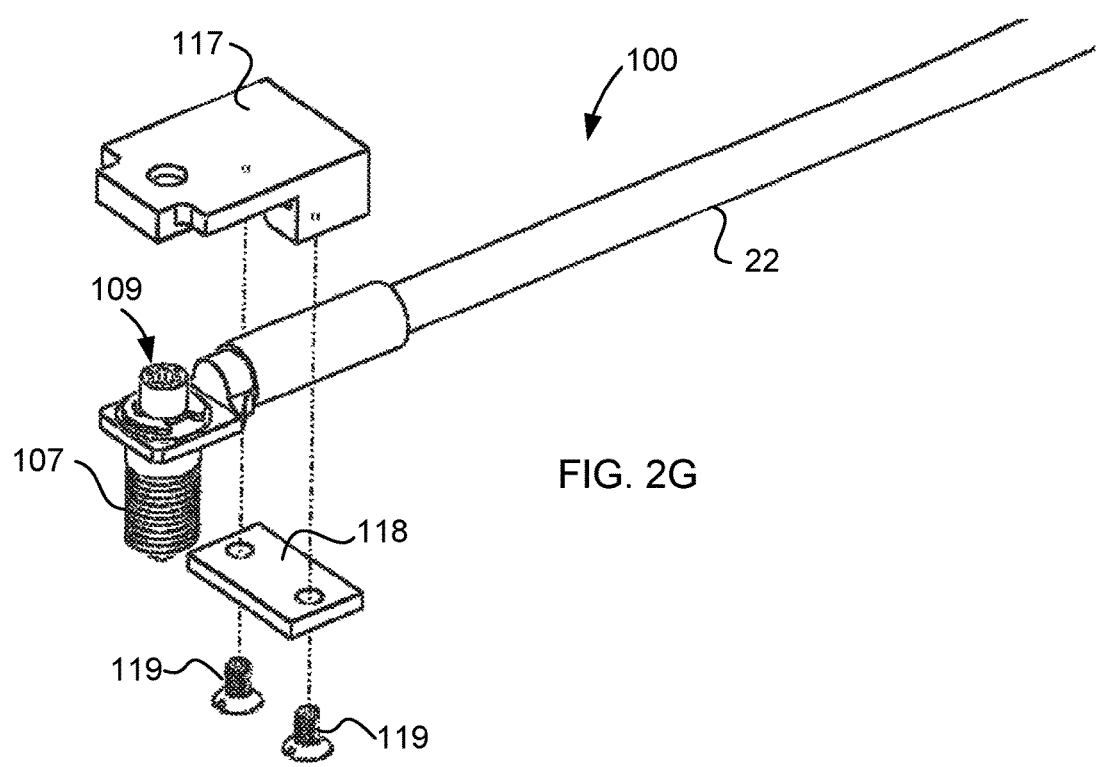
FIG. 2G shows an exploded view of the system of FIG. 2F according to an embodiment of the invention.

FIGS. 2D and 2E show an alternate embodiment of a protector where flip down protector 115 can protect the line tap. FIGS. 2F and 2G show an alternate embodiment of a protector where protector 117 can also protect the line tap. Protector 117 can have lower portion 118 that can be affixed over the line tap by screws 119. Flip down protector 115 operates similar to protector 30 in FIG. 1B. Specifically, protector 115 protects contact ring 106 and retaining ring 108, keeping these elements clean, thereby maintaining effective operation of the system over time. In addition, the shape of protector 115 may fit securely within the top of receptacle 18, providing further physical stability to the connection between wires 20 and 22.

Figure 3B:
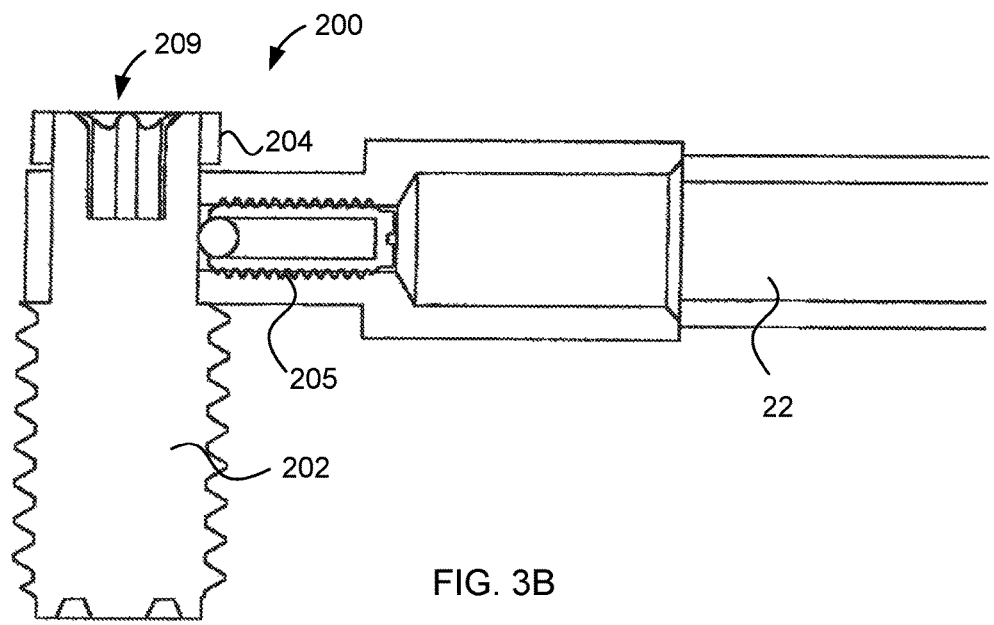
FIG. 3B is a sectional side elevation view corresponding to FIG. 3A according to an embodiment of the invention.
Figure 3A:
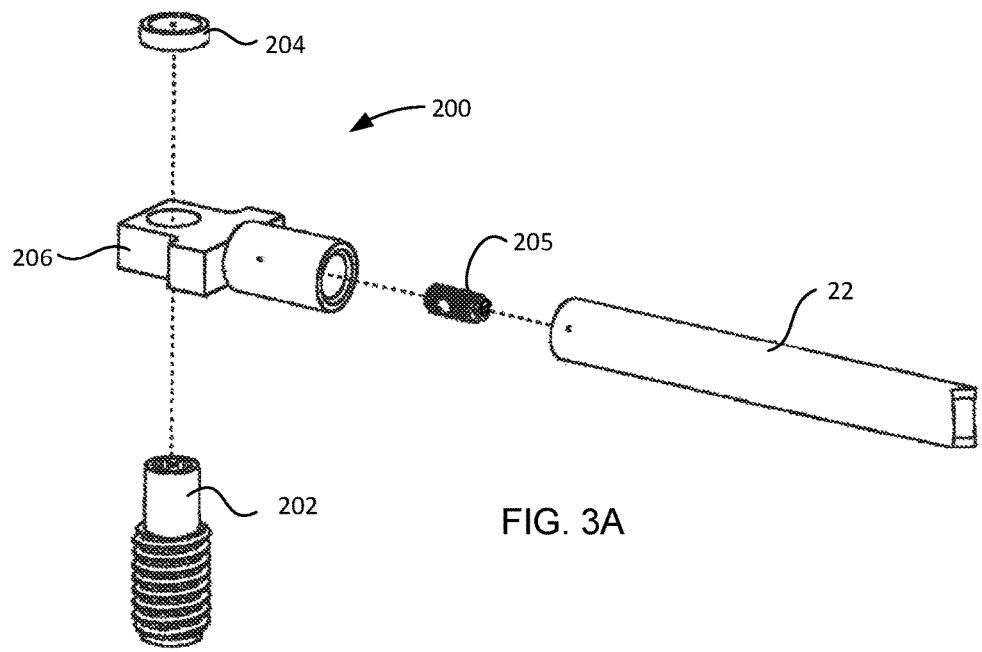
FIG. 3A is an exploded perspective view of a second embodiment of a line tap for use with the present system according to an embodiment of the invention.
Figure 3C:
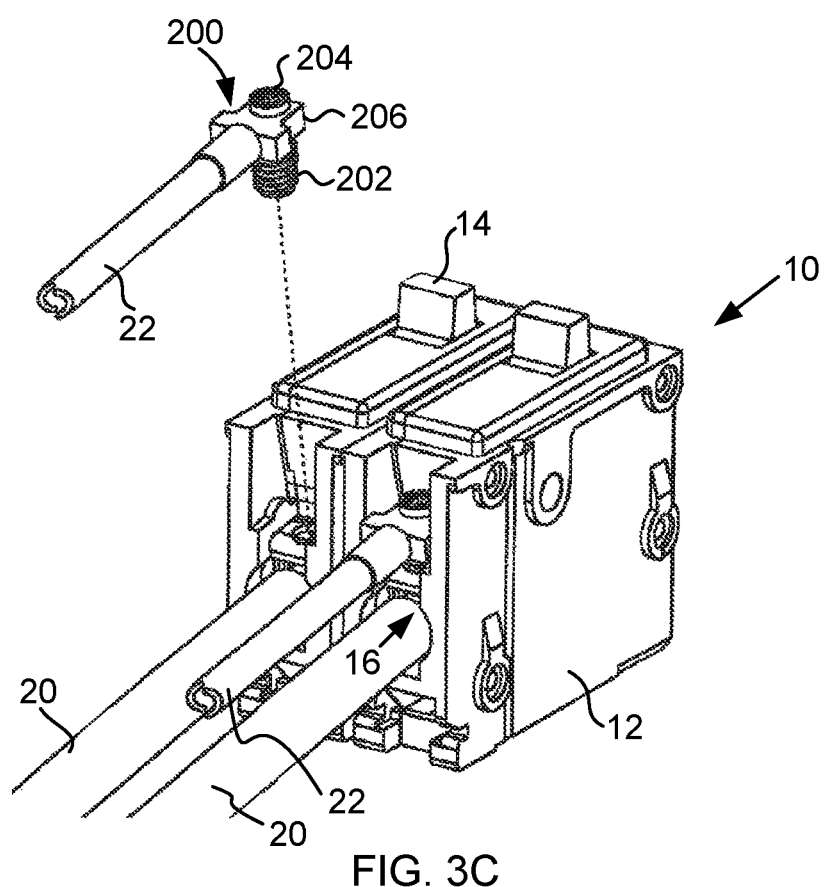
FIG. 3C is a perspective view of the line tap of FIGS. 3A and 3B received into a circuit breaker according to an embodiment of the invention.

FIGS. 3A to 3C show second exemplary screw assembly 200 inserted into breaker 10. Screw assembly 200 can also connect utility power wire 20 into receptacle 16. Screw assembly 200 can include screw 202 that can be received within a conductive ring 204 that is in turn received within a metallic clasp 206. Ring 204 can be press-fit onto screw 202, thereby preventing clasp 206 from falling off. Screw 202 can be accessed from above such that screw 202 can be loosened or tightened with a screwdriver (when inserted into head 209). Electrical connection can be maintained from wire 22 through clasp 206 and into screw 202, thereby providing an effective system for backfeeding photovoltaic power to the utility. Screw 205 can be used to push screw 202 against the far side of the hole in clasp 206. As such, electrical current passes through the contacting surfaces between screw 202 and clasp 206. In other optional embodiments, mechanical springs or O-rings can be used separately or together to bias the components together to maintain electrical contact. Screw assembly 200 can be substituted for utility/solar breaker U/SB in FIGS. 14F and 14G, thereby providing an efficient way to backfeed photovoltaic power to the utility.

Figure 4B:
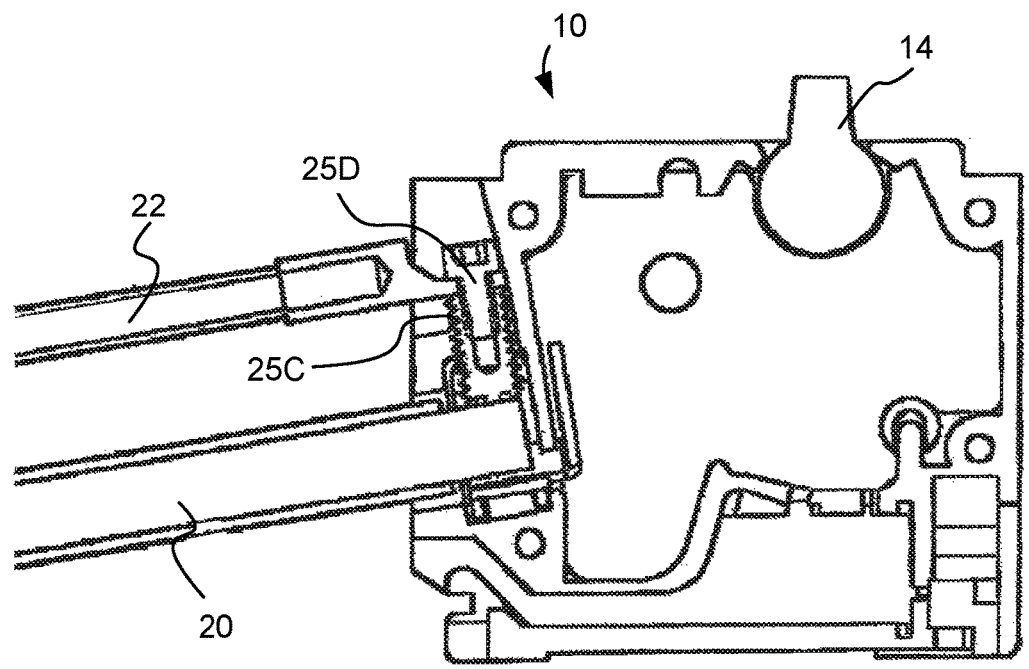
FIG. 4B is a sectional side elevation view of the alternate line tap mounted into the circuit breaker according to an embodiment of the invention.
Figure 4A:
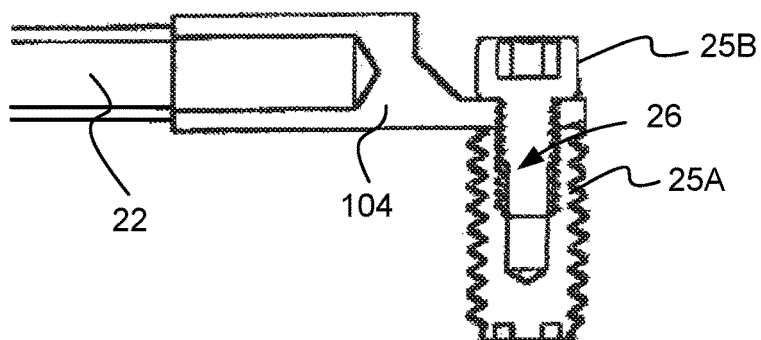
FIG. 4A is a sectional side elevation view of an alternate line tap for use with the present system according to an embodiment of the invention.
Figure 4C:
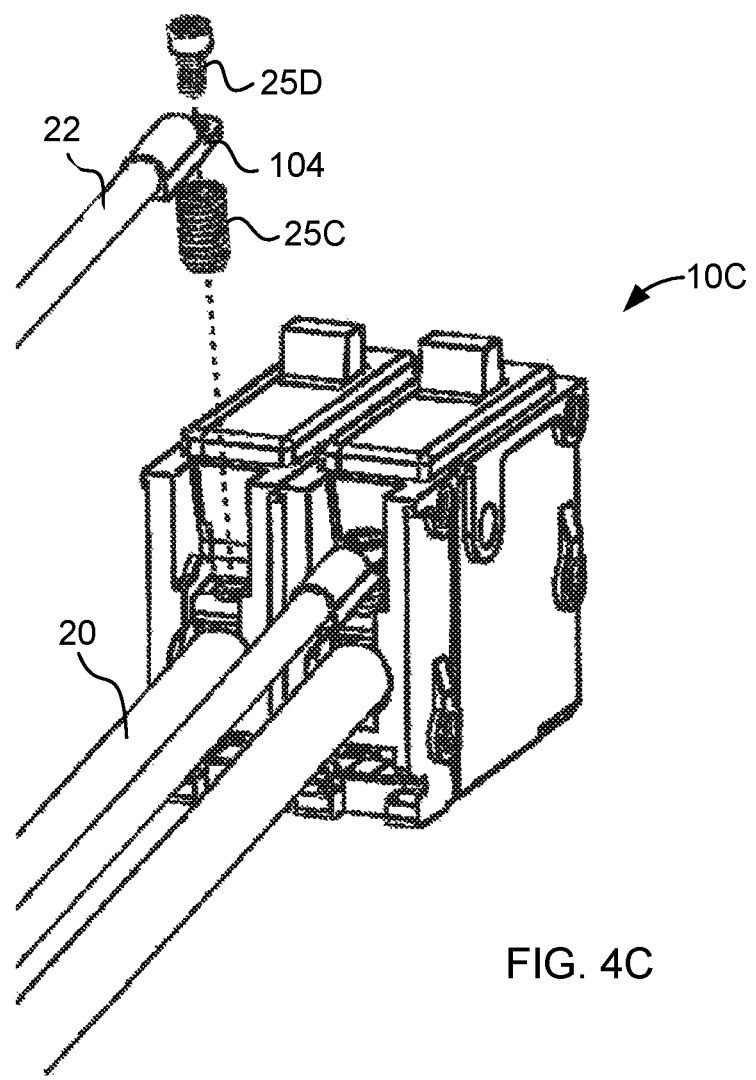
FIG. 4C is a perspective view of the line tap of FIG. 4A received into a circuit breaker according to an embodiment of the invention.

FIGS. 4A to 4C show another exemplary supply side line tap design for use with the present system. Screw assembly 25 may include a pair of nested screws 25A and 25B. First screw 25A connects utility power wire 20 into receptacle 16. First screw 25A has a hollow interior recess that is accessible from above. Second screw 25B can be received (e.g.: nested) within the hollow interior recess of first screw 25A. First screw 25A can secure utility wire 20 into receptacle 16. Thereafter, second screw 25B can secure photovoltaic power array wire 22 onto first screw 25A, thereby making electrical contact between wires 20 and 22. Specifically, photovoltaic wire 22 can be received within clasp 104 and clasp 104 can be held into receptacle 18 by second screw 25B.

In addition, first screw 25A can have an upper recess 26 that either receives a screwdriver (for tightening screw 25A into receptacle 16) or receives the end of second screw 25B therein. As such, an installer can first secure utility wire 20 with screw 25A (by tightening the screw hear in recess 26) and then install photovoltaic wire 22 with screw 25B (by tightening the top of screw 25B. Screw assembly 25 can be substituted for utility/solar breaker U/SB in FIGS. 14F and 14G, thereby providing an efficient way to backfeed photovoltaic power to the utility.

In alternate embodiments, the line tap can be provided by photovoltaic wire 20 being grasped by a clasp or restraint mounted on circuit breaker 10. Thus, the installer would only need to insert the end of wire 20 into a receptacle on circuit breaker 10 for the line tap connection to be made between wires 20 and 22. In other alternative embodiments, the present line tap need not be made at the circuit breaker location, but to alternate locations, including into the mechanical bussing that is electrically connected to the breakers, or even into plug pieces that connect into the meter socket.

Figure 5A:
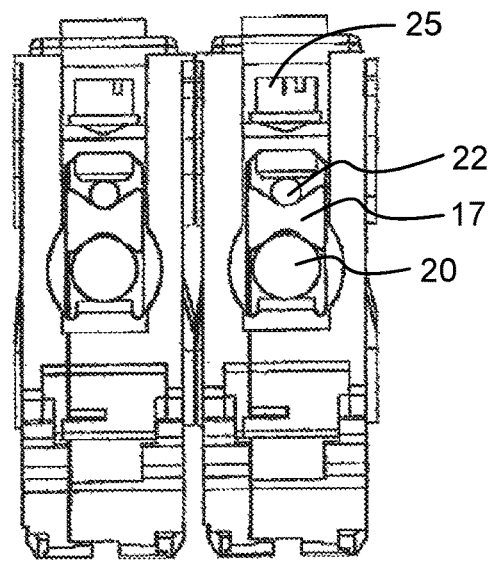
FIG. 5A is a rear elevation view of an alternate circuit breaker for use with the present system according to an embodiment of the invention.
Figure 5B:
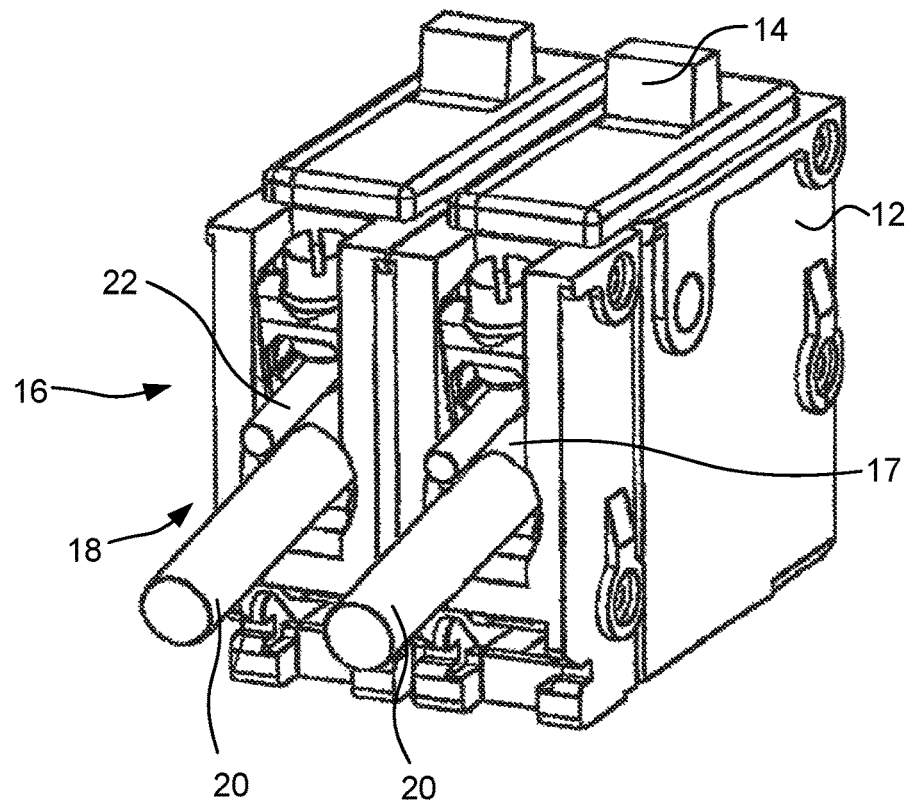
FIG. 5B is a perspective view of the circuit breaker of FIG. 5A according to an embodiment of the invention.

FIGS. 5A and 5B describe an alternate circuit breaker design keeping first and second receptacles 16 and 18 in electrical communication with one another such that wires 20 and 22 can be in electrical communication with one another to permit backfeeding to the utility. This embodiment of the system can provide a continuous electrical pathway between receptacles 16 and 18 built into the body of circuit breaker 10A. Specifically, a preferred hourglass shaped conductor 17 can be positioned between first and second receptacles 16 and 18. As understood herein, the term "hourglass" can include any structure having widened ands and a narrowed mid-section. For example, an hourglass structure can have curved or straight portions around the narrowed mid-section of the hourglass. As such, the hourglass shape can be opposing circular portions cut away from the mid-section of a piece of material. Or, the hourglass shape may be formed from a pair of opposing V-shaped sections cut away from the mid-section of a piece of material.

In operation, the tightening of screw 25 can compress wires 20 and 22 together with conductor 17 positioned therebetween. Conductor 17 thus provides an electrically conductive path between wires 20 and 22, so as to provide for backfeeding of power to the utility. An advantage of the hourglass shape of conductor 17 is that it nestles between wires 20 and 22 ensuring a strong electrical connection, while also centering each of wires 20 and 22. Also, the hourglass shape of conductor 17 may ensure that smaller diameter wire 22 is not crushed or frayed by the tightening of screw 25. In preferred embodiments, the upper and lower V-shaped sides of conductor 17 may be made to different angles and may be curved to fit around parts of the circumferences of the two wires. Shaping the top and bottom edges of conductor 17 in this manner may advantageously adjust the clamping forces applied to each of wires 20 and 22. For example, the hourglass shape of conductor 17 may be formed by two opposing V-shaped cut outs with one of the V-shaped cutouts being smaller (so as to be received against photovoltaic power wire 22) and the other of the V-shaped cutouts being larger (so as to be received against utility power wire 20). Circuit breaker 10A can be substituted for utility/solar breaker U/SB in FIGS. 14F and 14G, thereby providing an efficient way to backfeed photovoltaic power to the utility.

Figure 6A:
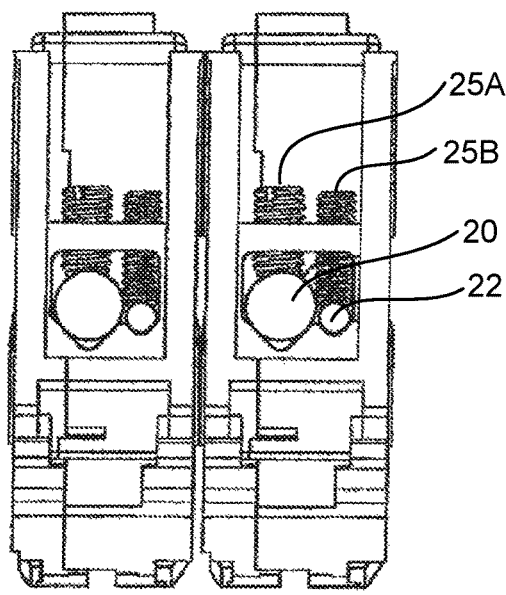
FIG. 6A is a rear elevation view of an alternate circuit breaker for use with the present system.
Figure 6B:
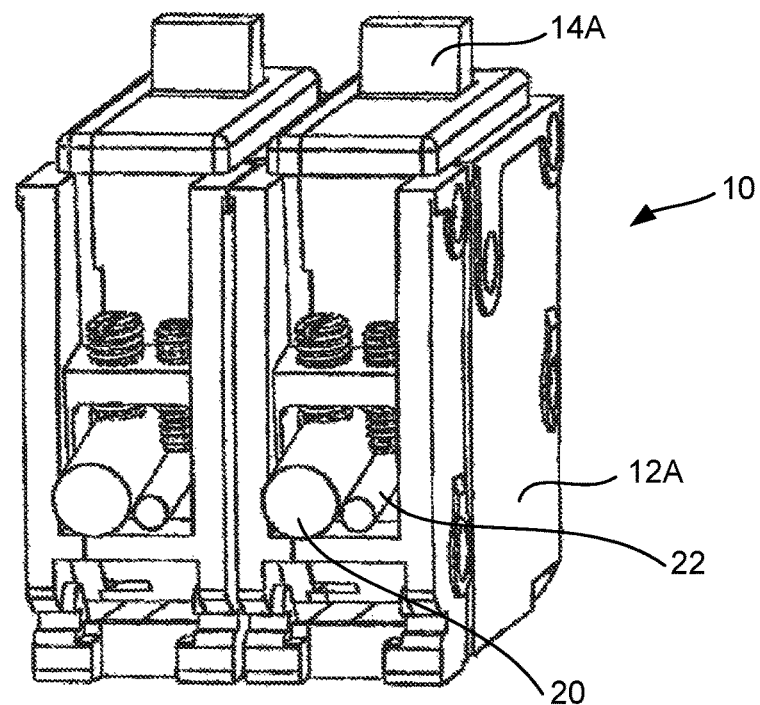
FIG. 6B is a perspective view of the circuit breaker of FIG. 6A according to an embodiment of the invention.

Turning next to FIGS. 6A and 6B, another circuit breaker 10B is provided. A first screw 25A and a second screw 25B can be used to separately secure wires 20 and 22 into breaker 10B. Wires 20 and 22 can sit side-by-side, being in electrical communication with one another, as shown. In this embodiment, conductor 17 can be received below wires 20 and 22. As shown, conductor 17 may be shaped with portions having different curvatures under each of wires 20 and 22 so that the diameter of each wire is supported in a manner that prevents the ends of the wires from being crushed or frayed as screws 25A and 25B are tightened. An advantage of using separate screws 25A and 25B (as opposed to just one screw 25) is that wires 20 and 22 can be separately installed (or removed) one at a time. Circuit breaker 10B can be substituted for utility/solar breaker U/SB in FIGS. 14F and 14G, thereby providing an efficient way to backfeed photovoltaic power to the utility.

Figure 7A:
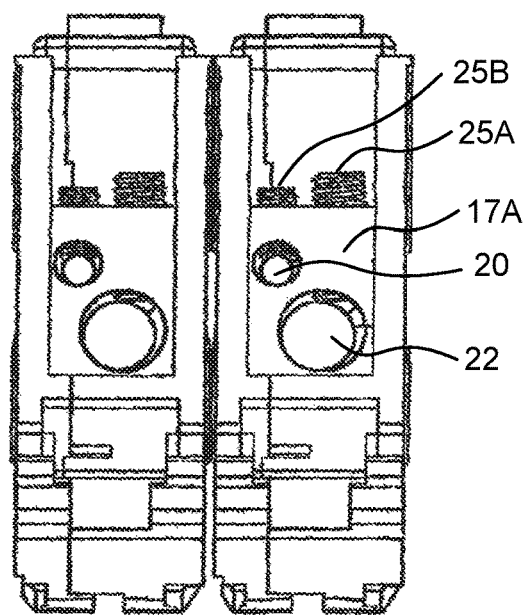
FIG. 7A is a rear elevation view of an alternate circuit breaker for use with the present system according to an embodiment of the invention.
Figure 7B:
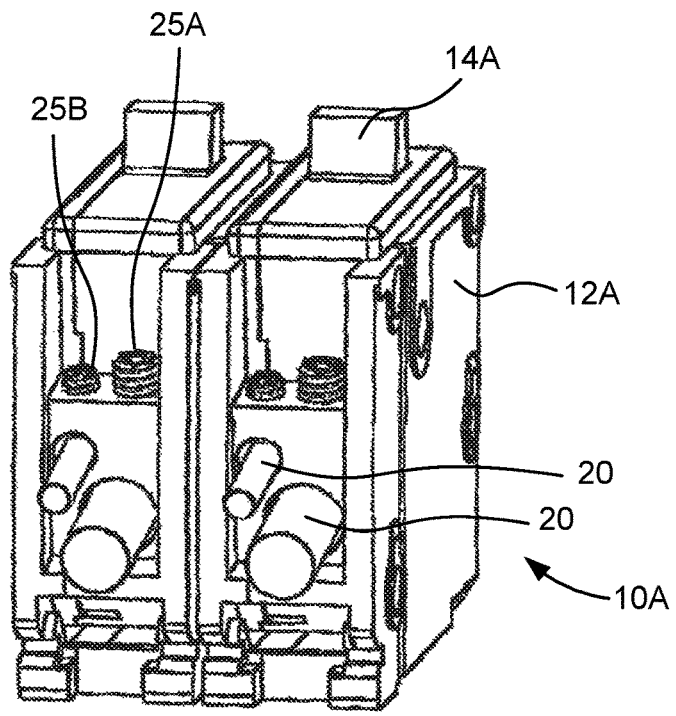
FIG. 7B is a perspective view of the circuit breaker of FIG. 7A according to an embodiment of the invention.

Turning next to FIGS. 7A and 7B, another alternate circuit breaker 10C is provided. This embodiment can have a conductor 17A with a separate hole for each of wires 20 and 22 to be received therethrough. An advantage of using separate screws 25A and 25B (as opposed to just one screw 25) is that wires 20 and 22 can be separately installed (or removed) one at a time. In alternate embodiments, the holes through which wires 20 and 22 are received can be positioned side-by-side, or slightly above one another, as shown. Conductor 17A maintains electrical contact between wires 20 and 22. Circuit breaker 10C can be substituted for utility/solar breaker U/SB in FIGS. 14F and 14G, thereby providing an efficient way to backfeed photovoltaic power to the utility.

Figure 8A:
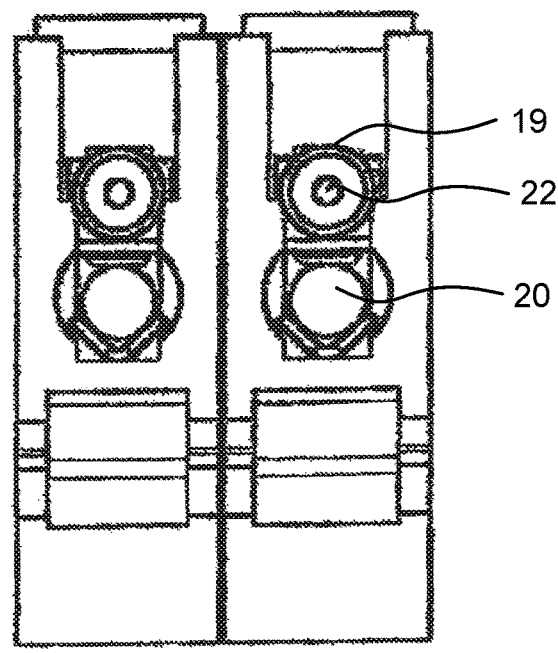
FIG. 8A is a rear elevation view of an alternate circuit breaker for use with the present system according to an embodiment of the invention.
Figure 8B:
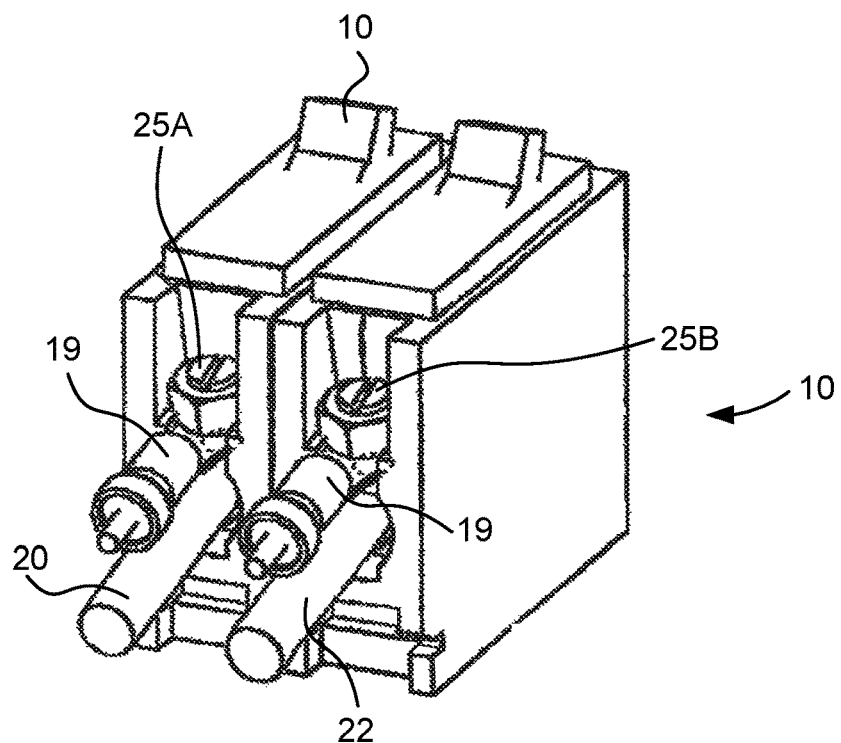
FIG. 8B is a perspective view of the circuit breaker of FIG. 8A according to an embodiment of the invention.

Turning next to FIGS. 8A and 8B, another embodiment of circuit breaker 10D can be provided. This embodiment adds ring terminal 19 to an existing breaker. The advantage of this design is that the installer is able to leave the existing breaker in the breaker box during installation. Circuit breaker 10D can also be substituted for utility/solar breaker U/SB in FIGS. 14F and 14G, thereby providing an efficient way to backfeed photovoltaic power to the utility.

Figure 9B:
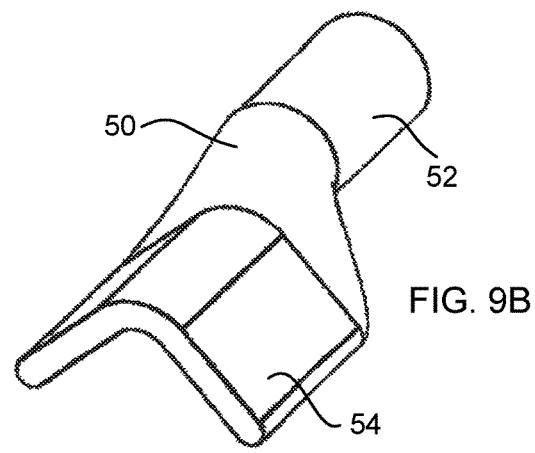
FIG. 9B is a perspective view of an element of the line tap for use in the circuit breaker of FIG. 9A according to an embodiment of the invention.
Figures 9A, 9C:
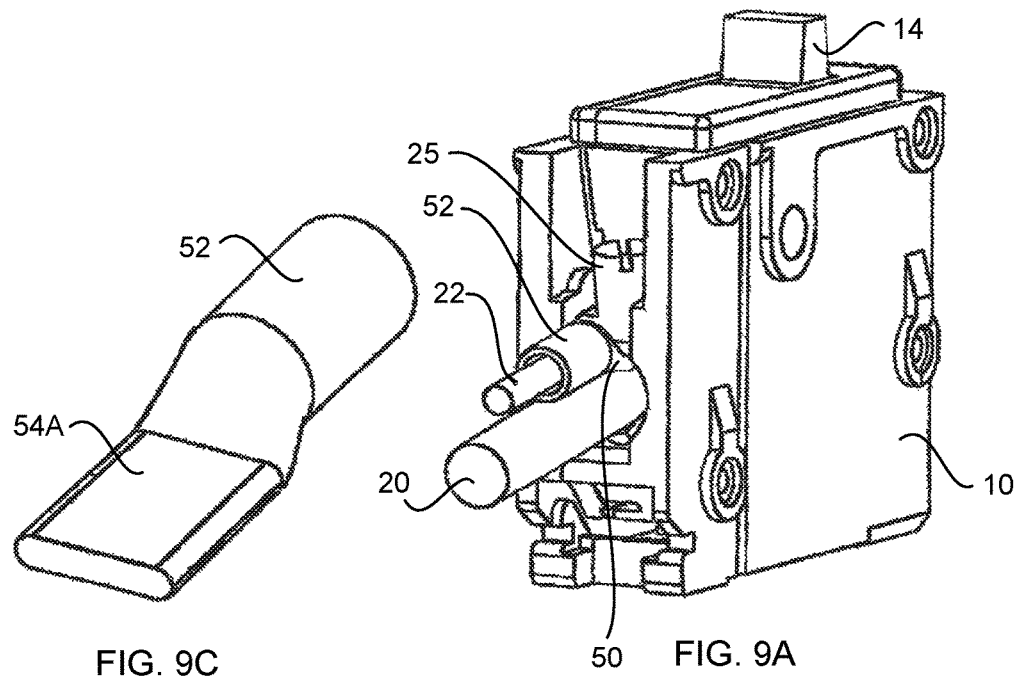
FIG. 9A is a rear perspective view of a circuit breaker having another alternate line tap according to an embodiment of the invention.
FIG. 9C is a perspective view of an alternate design of the line tap for use in the circuit breaker of FIG. 9A according to an embodiment of the invention.

Turning next to FIGS. 9A to 9C, a lug connector for "piggybacking" the photovoltaic power wire 22 onto the utility power wire 20 is provided. In this embodiment, a standard circuit breaker 10E having a receptacle 16 for receiving a utility power wire 20 therein is provided. In accordance with the present invention, piggyback lug connector 50 can electrically connect photovoltaic power wire 22 to utility power wire 20, as follows.

Piggyback lug connector 50 can include first end 52 that is dimensioned to wrap around an end of the photovoltaic power wire 22 and be crimped onto photovoltaic power wire 22. It can also include second end 54 that is dimensioned to wrap partially around an end of utility power wire 20 and be received into receptacle 16 together with the end of utility power wire 20. In one embodiment, second end 54 of lug connector 50 wraps partially around a top side of utility power wire 20. As such, first end 52 of lug connector 50 can be dimensioned to wrap around a smaller wire than second end 54 of the lug connector (FIG. 9B). In an alternate embodiment, however, second end 54A may be flattened (FIG. 9C). In operation, second end 54 (or 54A) can simply be inserted into the circuit breaker 10E and then screw 25 can be tightened to hold wires 20 and 22 securely in their installed positions. One advantage of using piggyback lug connector 50 is that it provides a fast and easy way to electrically connect photovoltaic power wire 22 to utility power wire 20 without requiring the redesign of the circuit breaker itself.

Figure 10A:
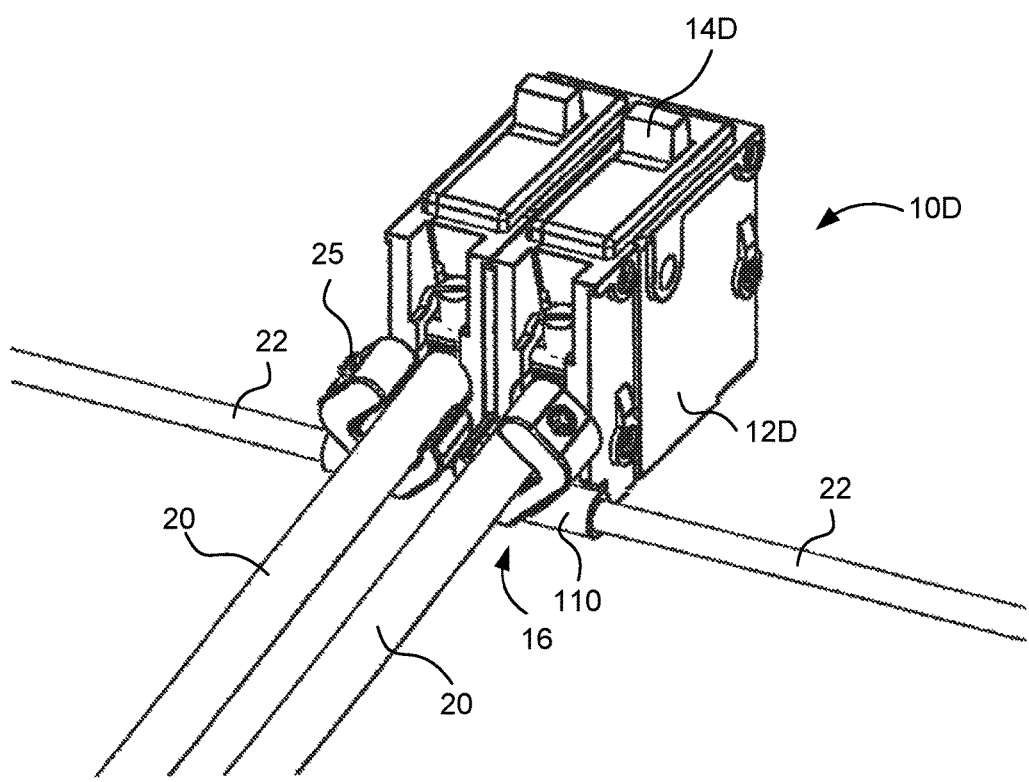
FIG. 10A is a rear perspective view of a circuit breaker having a line tap according to an embodiment of the invention.
Figure 10B:
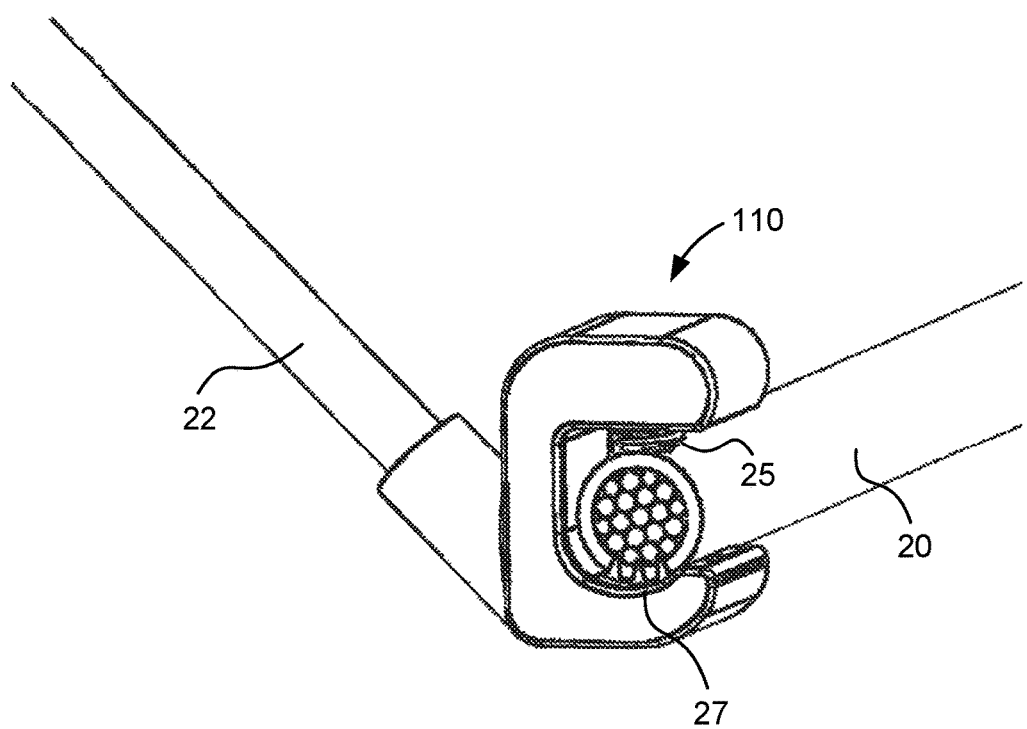
FIG. 10B is a close-up perspective view of the line tap of FIG. 10A according to an embodiment of the invention.

Turning next to FIGS. 10A and 10B, connector 110 can electrically connect utility wire 20 and photovoltaic wire 22 into circuit breaker 10F. Connector 110 can be an insulation piercing connector with screw 25 being rotatable to pierce through the insulation 23 to contact utility power wire 20 therein. FIG. 10B shows an embodiment with lower teeth 27, which can assist in holding utility power wire 20 firmly in position. One advantage of this line tap design is that photovoltaic power wires 22 can enter from the sides (i.e.: in a substantially perpendicular direction). Moreover, the line tap connection can be made near or immediately adjacent to receptacle 16. By electrically connecting wires 20 and 22, this embodiment can be used to backfeed power to the utility.

FIGS. 11 to 13B show various insulation piercing connectors for electrically connecting photovoltaic power wire 22 to utility power wire 20. In operation, these insulation piercing connectors provide a line tap of the photovoltaic power line 22 into the main utility line 20 at a location that can be at, near or even distant from the circuit breaker.

Figure 11:
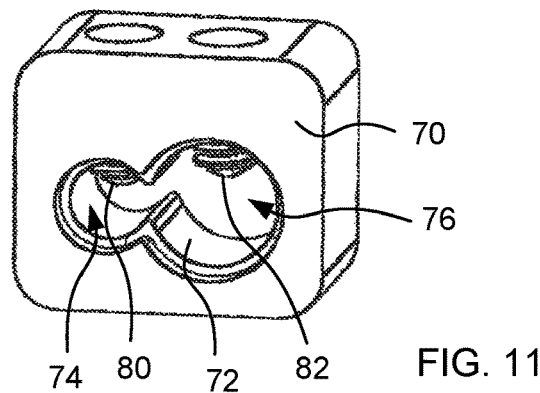
FIG. 11 is a perspective view of an alternate line tap according to an embodiment of the invention.

FIG. 11 shows connector 70 having conductive metal portion 72 with two holes 74 and 76 passing therethrough. Holes 74 and 76 optionally have different diameters, and dedicated screws 80 and 82. In use, photovoltaic wire 22 can be inserted into hole 74 and utility wire 20 can be inserted into hole 76. When screws 80 and 82 are tightened, they can project through the wire insulation and into wires 20 and 22 (thereby electrically connecting the wires to one another). Connector 70 can optionally be positioned near circuit breaker 10, or elsewhere in the breaker box, or at alternate locations including into the mechanical bussing that is electrically connected to the breakers, or even into plug pieces that connect into the meter socket.

Figure 12A:
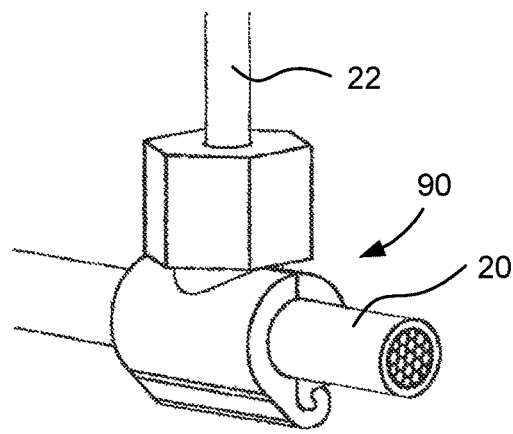
FIG. 12A is a perspective view of an alternate line tap according to an embodiment of the invention.
Figure 12B:
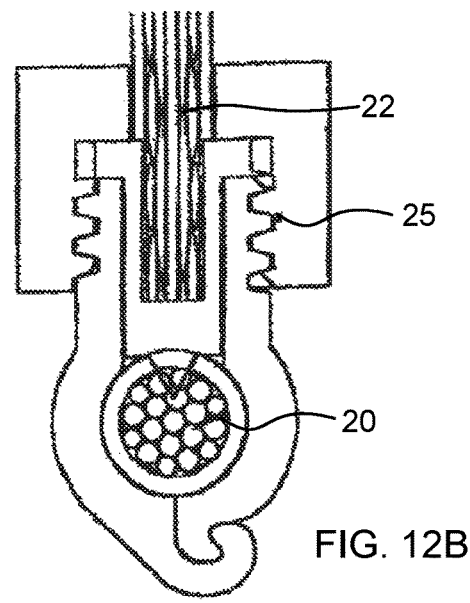
FIG. 12B is a sectional end elevation view of the line tap of FIG. 12A according to an embodiment of the invention.

FIGS. 12A and 12B show connector 90. When screw 25 is tightened, the distal end of the screw can project through the insulation of wire 20 (thereby electrically connecting utility wire 20 to photovoltaic wire 22). Each of the embodiments shown in FIGS. 11 to 12B can be used to provide a supply side line-tap, thereby permitting backfeeding of photovoltaic power to the utility.

Figure 13A:
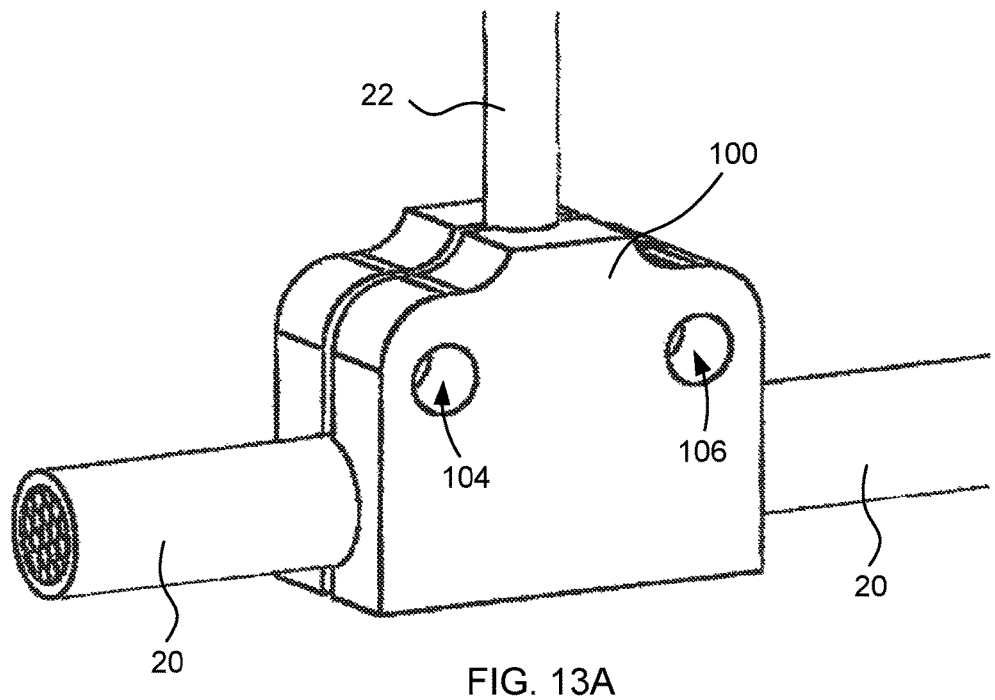
FIG. 13A is a perspective view of an alternate line tap according to an embodiment of the invention.
Figure 13B:
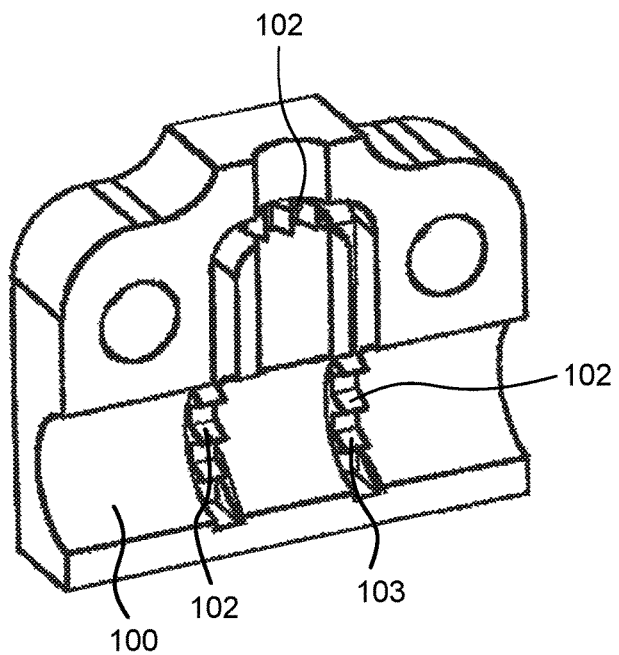
FIG. 13B is a sectional perspective view of the line tap of FIG. 13A according to an embodiment of the invention.

FIGS. 13A and 13B show connector 100 having internal metal structure 102 (being two upside-down U-shaped pieces of metal on opposite sides of the device). Holes 104 and 106 can receive screws (not shown) passing therethrough. When these screws are tightened, connector 100 can be compressed, pushing the opposite U-shaped pieces of metal towards one another, thereby crimping against wires 20 and 22 received therein. Teeth 103 on this structure can pierce through the insulation of both of utility wire 20 and photovoltaic wire 22 under these compressive forces, thereby putting wires 20 and 22 into electrical communication with one another. An advantage of connector 100 is that it can be used at a variety of locations near or far from circuit breaker 10.

Figure 14A:
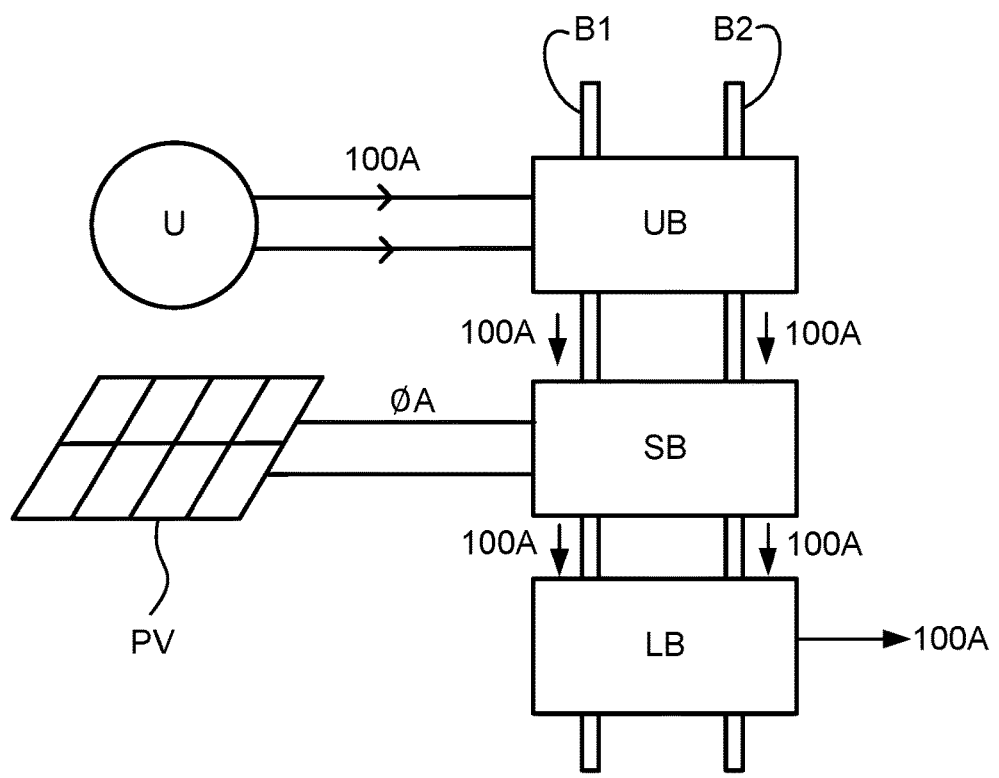
FIG. 14A is an electrical schematic of an electrical system with a utility and a photovoltaic power supply connected to the bus bars in a main breaker box at a time when the utility is supplying all the power to the house load.
Figure 14B:
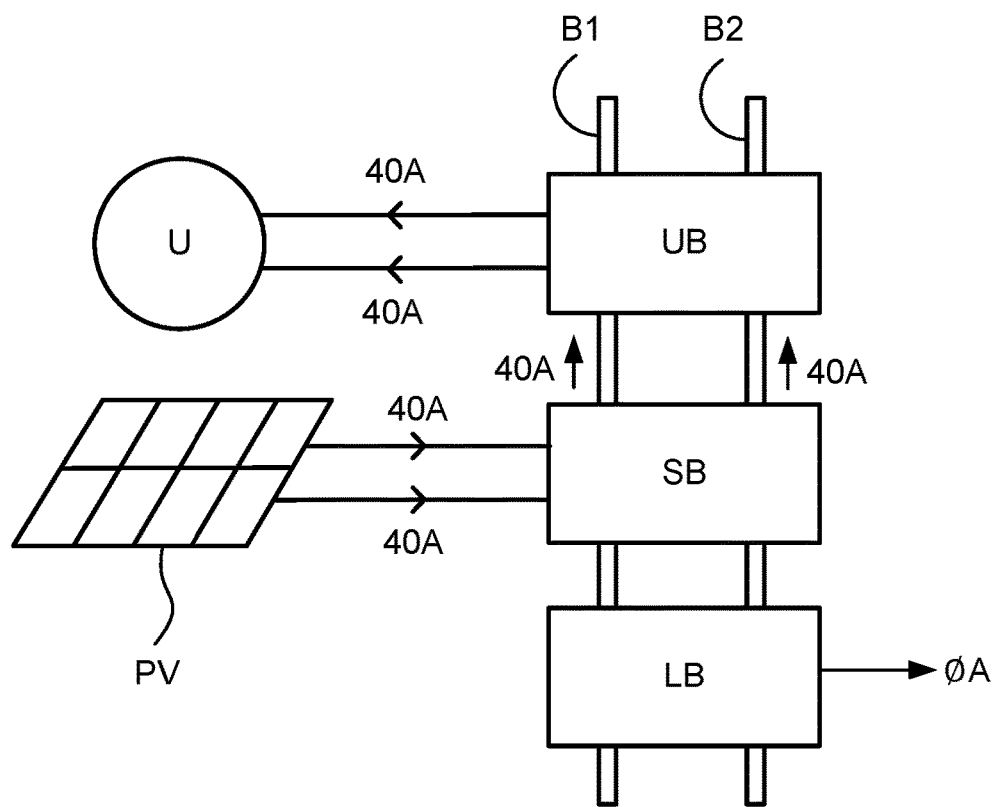
FIG. 14B is an electrical schematic of the system of FIG. 14A, but at a time when the house load is instead zero and the photovoltaic array is backfeeding directly to the utility.
Figure 14C:
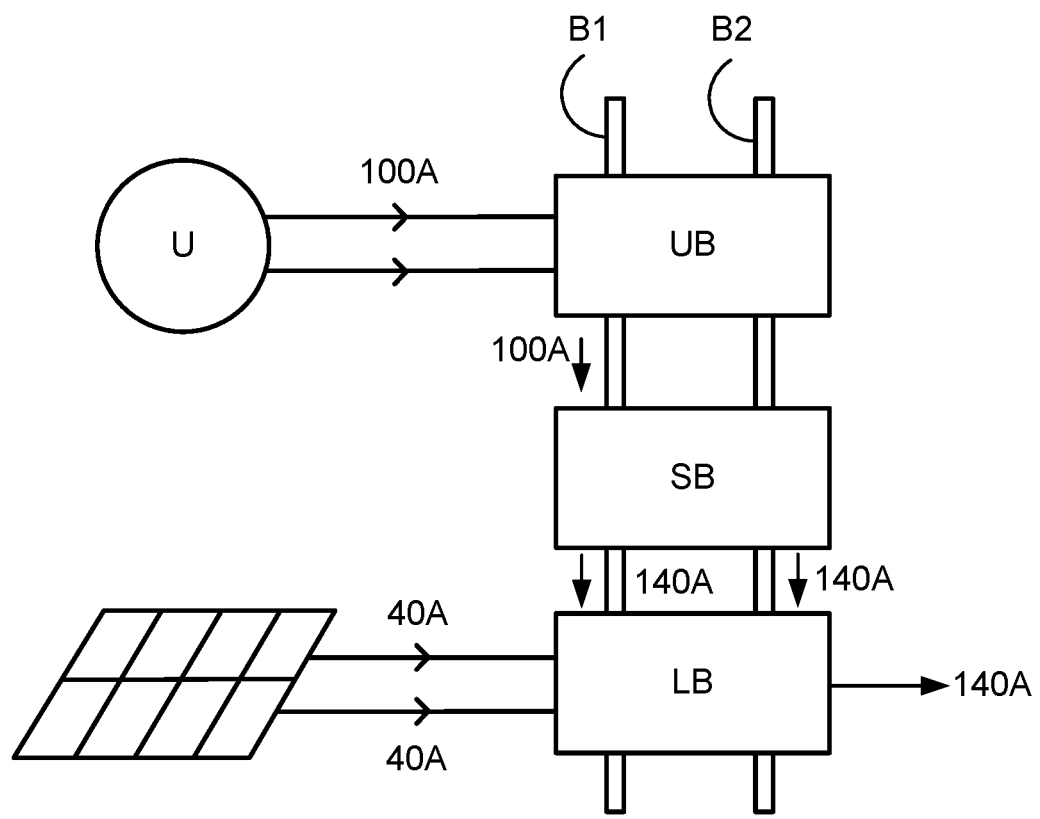
FIG. 14C is an electrical schematic of the system of FIGS. 14A and 14B, but at a time when the house load is overloading the bus bars.
Figure 14D:
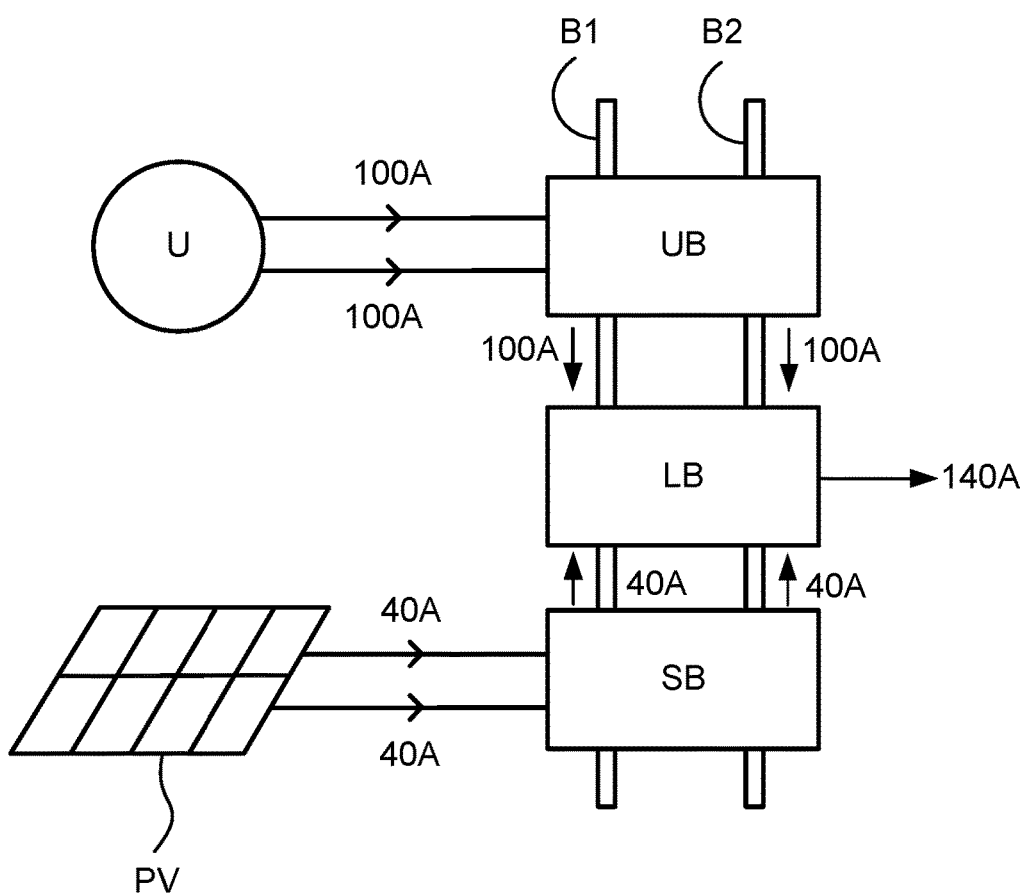
FIG. 14D is an electrical schematic of an electrical system with a utility and a photovoltaic power supply connected at opposite ends of the bus bars in the main breaker box at a time when the utility and the photovoltaic array are both supplying power to the house load.
Figure 14E:
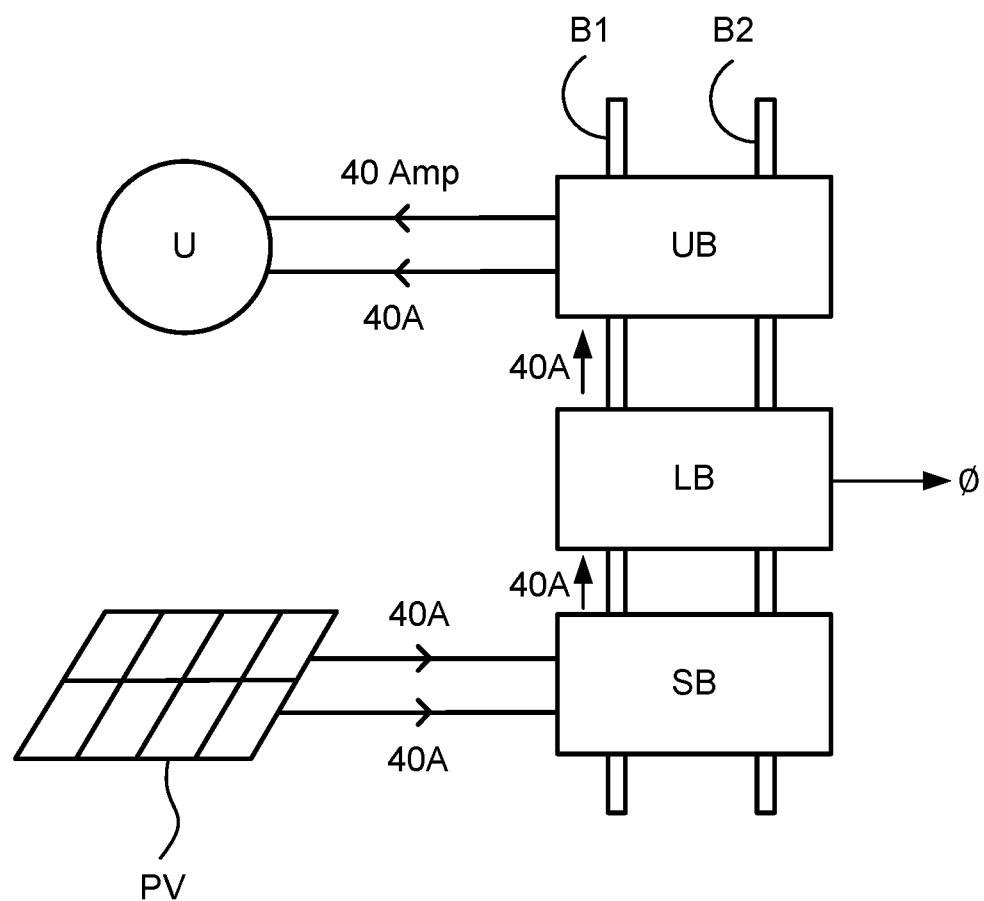
FIG. 14E is an electrical schematic of the system of FIG. 14D, but at a time when the house load is instead zero and the photovoltaic array is backfeeding directly to the utility.
Figure 14F:
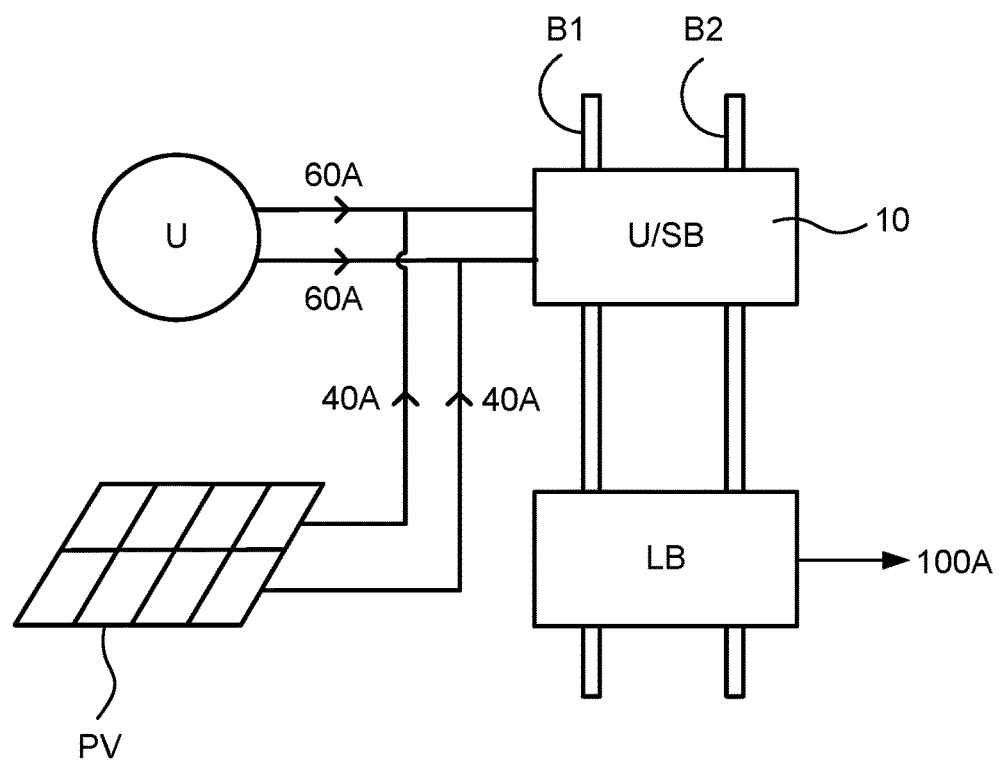
FIG. 14F is an electrical schematic of a third electrical system corresponding to the present invention with the utility and a photovoltaic power supplies both connected through the present novel breaker to the bus bars in the main breaker box.
Figure 14G:
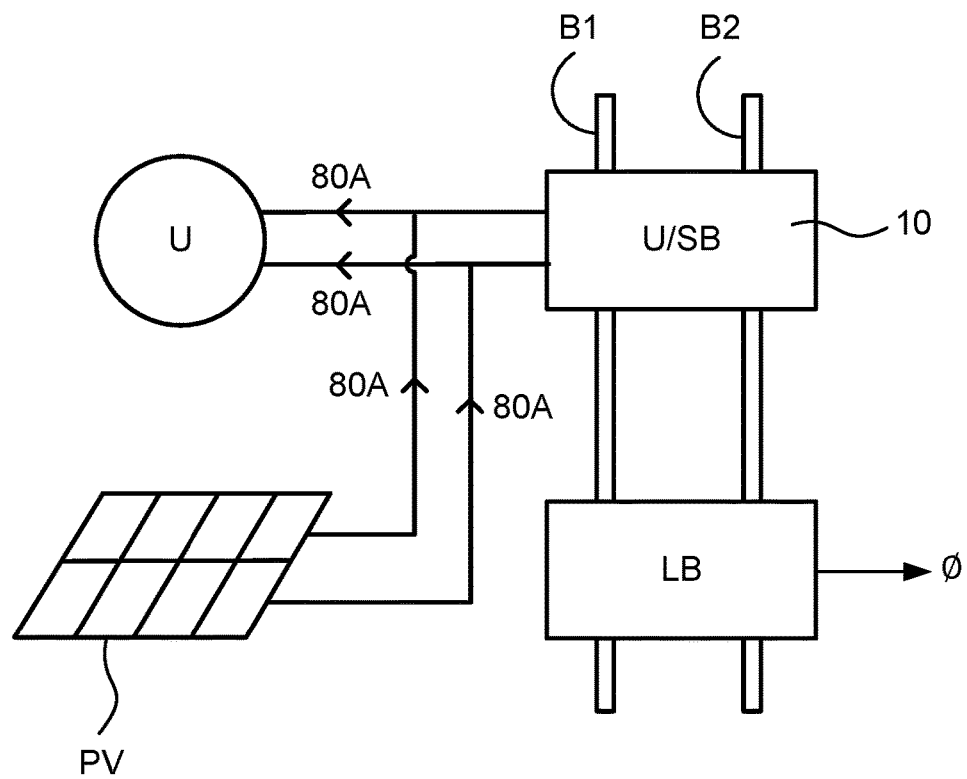
FIG. 14G is an electrical schematic corresponding to FIG. 14F, but is instead backfeeding a higher current to the utility.

Advantages of the present line-tap system can be further understood by viewing FIGS. 14A to. Specifically, FIGS. 14A to 14C show the dangers of overloading the bus bars when backfeeding power from a photovoltaic array to a utility. Next, FIGS. 14D and 14E show a known workaround being a second electrical system configuration that overcomes these dangers. However, this second electrical system workaround configuration has its own limitations. Accordingly, FIGS. 14F and 14G show the electrical system configurations into which the present invention can be incorporated.

FIGS. 14A to 14G describe describe configurations in which power from a photovoltaic system can be backfed into a utility. It is to be understood, however, that the present system is not limited to photovoltaic systems. For example, any references to a "photovoltaic array" could refer to any alternative power sources, including but not limited to wind, battery, power generators, or any other form of renewable or non-renewable energy, including gas generators, etc. Thus, utility/solar breaker "U/SB" can also be understood to refer to a utility/wind power breaker, etc.

FIG. 14A shows bus bars B1 and B2 in a standard breaker box. Utility breaker UB connects utility power mains from utility U to bus bars B1/B2. Photovoltaic solar breaker SB connects photovoltaic power from photovoltaic array PV to bus bars B1/B2. A load breaker LB is also connected to bus bars B1/B2. (Note: load breaker LB schematically represents the plurality of circuit breaker loads commonly found in a typical home circuit breaker box).

In FIG. 14A, utility U is supplying 100 Amps which pass through bus bars B1/B2 to supply 100 Amps of current. This situation may occur at night when no power is supplied by the photovoltaic array PV. In FIG. 14B, photovoltaic array PV is supplying 40 Amps of current, but the building's load is negligible. As such, the 40 Amps of current are simply backfed to the utility. This situation may occur during the day when the homeowner is at work. The homeowner receives credit for this backfed power on their utility bill. Unfortunately, this solution is not presently compliant with building Codes since compliance will limit what can be backfed through solar breaker SB to 20% of the amount of the rated 100 Amps of the utility breaker UB. In other words, in this example, the backfeed layout shown in FIG. 14B is only Code compliant up to 20 Amps of generated PV power.

FIG. 14C represents a dangerous situation using the above described electrical configuration. Here, utility U is supplying 100 Amps to bus bars B1/B2 and the photovoltaic array PV is supplying 40 Amps to bus bars B1/B2 as well. This situation could occur if the building load reached 140 Amps. This situation could occur on the weekend when the building occupants are home using power and the sun is shining. However, the danger is that 140 Amps of current will be passing through a portion of the bus bars B1/B2, as shown. This could overload (and damage) the bus bars (which here are rated at 100 Amps maximum current).

FIG. 14D shows one solution to this problem. Here, utility breaker UB and photovoltaic solar breaker SB are installed at opposite ends of bus bars B1/B2 with building load LB positioned therebetween. In this arrangement, utility U still supplies 100 Amps of current and the photovolatic array PV still supplies 40 Amps of current, so that the building occupants are free to draw 140 Amps. The advantage of this arrangement is that no portion of bus bars B1/B2 ever exceed 100 Amps of current passing therethrough. FIG. 14E shows the same wiring arrangement when the building load is negligible and the photovolatic array PV supplies 40 Amps of current (for example when the homeowner is away at work). At this time, the 40 Amps generated by photovolatic array PV is simply backfed to utility U (and the homeowner may also receive credit for this on their utility bill).

The disadvantage of wiring arrangement of FIGS. 14D and 14E is that should the positions of solar breaker SB and load breaker LB ever be reversed, the bus bars could be overloaded. Therefore, a new solution, as shown in FIGS. 14F and 14G, is provided.

In FIG. 14F, a combined solar and utility breaker U/SB (labeled 10 in FIGS. 1A to 4C, 10A in FIGS. 5A and 5B, 10B in FIGS. 6A and 6B, 10C in FIGS. 7A and 7B, 10D in FIGS. 8A and 8B, 10E in FIG. 9A, 1OF in FIG. 10A, 70 in FIG. 11, 90 in FIGS. 12A and 12B and 100 in FIG. 13A) is provided. In breaker US/B the utility and photovoltaic power supplies can both be connected into the same breaker which is attached to bus bars in the main breaker box. Breaker 10, 10A, 10B, 10C, 10D, 10E, 1OF could be set to trip at the same 100 Amps of the standard utility breaker UB such that the amount of combined current from both photovolatic array PV and utility U would never exceed 100 Amps. The advantage of this approach is that combined solar and utility breaker 10 can preferably be used to simply replace an existing standard utility breaker UB (with no other re-wiring or re-positioning of breakers being required).

Advantageously as well, whenever the building load in low, the current supplied by photovolatic array PV can be directly backfed to utility U. As seen in FIG. 14G, an advantage of the present system is that when higher amounts of power are generated by photovoltaic array PV, this power can be backfed to the utility. For example, in FIG. 1G, 80 Amps of current are being backfed to the utility (while breaker U/SB is still rated to trip at 100 Amps). This solution is Code complaint and it can allow higher current to be backfed to the utility than with any of the other scenarios discussed above.

Additional advantages of the present system may include increased installer safety and increased busbar protection. Moreover, the present system involves a small number of components, and thus requires minimal amounts of material in its fabrication. It is energy efficient and easy for an installer to use.

What is claimed is:

1. A System for electrically connecting a photovoltaic energy power wire to a utility power wire at a circuit breaker, comprising:
    a circuit breaker having a receptacle for receiving the utility power wire and a screw therein;
    a lug connector having a first end dimensioned to wrap around a distal end of the photovoltaic energy power wire and a second end dimensioned to wrap around at least a top side of the utility power wire;
    a clasp adapted to electrically connect to the distal end of the photovoltaic energy power wire, the clasp having aperture passing therethrough;
    the screw passing through the aperture in the clasp;
    a contact ring received around the screw; and
    a retaining ring adapted to hold the contact ring against the clasp such that the screw and the clasp are in electrical contact with one another, wherein the screw has a notch passing therearound, and wherein an inner surface of the retaining ring is received into the notch in the screw.

2. The system of claim 1, wherein the screw has a mid-section with a diameter greater than the diameter of the aperture in the clasp.

3. The system of claim 1, wherein the retaining ring keeps the screw and clasp fastened together when the screw is not electrically connected to the circuit breaker.

4. The system of claim 1, wherein the retaining ring and the contact ring keep the screw and the clasp in electrical contact as the screw is rotated.

5. The system of claim 1, wherein the receptacle is configured to receive a utility power wire and the screw such that the photovoltaic energy power wire and the utility power wire are both electrically connected to the circuit breaker.

6. The system of claim 1, wherein the screw has a narrow end that is received through the aperture in the clasp.

7. The system of claim 1, wherein the notch is positioned above the hole in the clasp when the screw passes through the aperture in the clasp.

8. The system of claim 1, wherein inner surfaces of the retaining ring are received into the notch.

9. The system of claim 1, further comprising a snap-on protecting cover that is positioned over a screw assembly, the screw assembly comprising the screw, the clasp, and the contact ring.

10. The system of claim 1, wherein the notch wraps around a circumference of the screw.

11. The system of claim 5, wherein the electrical connection between the photovoltaic energy power wire and the utility power wire bypasses a bus bar within the circuit breaker.

12. The system of claim 5, further comprising a conductor that forms the electrical connection between the photovoltaic energy power wire and the utility power wire.

13. The system of claim 12, wherein the conductor has an hourglass shape.

* * * * *